(12) United States Patent
Haga

(10) Patent No.: US 7,716,689 B2
(45) Date of Patent: May 11, 2010

(54) DISK-STORING DISK DEVICE WITH VIBRATIONAL PROOFING

(75) Inventor: Satoshi Haga, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 764 days.

(21) Appl. No.: 11/522,308

(22) Filed: Sep. 15, 2006

(65) Prior Publication Data

US 2007/0067791 A1 Mar. 22, 2007

(30) Foreign Application Priority Data

Sep. 22, 2005 (JP) .............................. 2005-275663

(51) Int. Cl.
G11B 17/03 (2006.01)
G11B 17/04 (2006.01)
G11B 33/02 (2006.01)

(52) U.S. Cl. ...................... 720/614; 720/611

(58) Field of Classification Search ................. 720/706, 720/713, 690, 610–614; 369/30.77, 30.78, 369/30.81, 30.85, 30.87

See application file for complete search history.

(56) References Cited

U.S. PATENT DOCUMENTS

| | | | |
|---|---|---|---|
| 5,986,981 A | | 11/1999 | Takemasa et al. |
| 6,097,693 A | * | 8/2000 | Nakamichi .................. 720/713 |
| 6,310,853 B1 | * | 10/2001 | Ito .............................. 720/607 |
| 2001/0017839 A1 | * | 8/2001 | Suzuki et al. ............... 369/192 |
| 2003/0112718 A1 | * | 6/2003 | Otsuki ..................... 369/30.85 |

FOREIGN PATENT DOCUMENTS

JP 2001-332004 11/2001

\* cited by examiner

Primary Examiner—William J Klimowicz
Assistant Examiner—Gustavo Polo
(74) Attorney, Agent, or Firm—Brinks Hofer Gilson & Lione

(57) ABSTRACT

A disk-storing disk device is disclosed. A disk-storing disk device may include: a plurality of supporting members for supporting a disk and disposed stacked in the axial direction of the disk; a supporting member selecting mechanism for spreading the spacing between selected and adjacent supporting members; and holding members moveably supported by each of the supporting members, the holding members for holding a disk between the holding members and each of the supporting member when the supporting member selecting mechanism moves the plurality of supporting members in the axial direction of the disk.

20 Claims, 20 Drawing Sheets

X1 ←→ X2

DISK-STORING DISK DEVICE WITH VIBRATIONAL PROOFING

RELATED APPLICATIONS

The present application claims priority to Japanese Patent Application Serial Number 2005-275663, filed Sep. 22, 2005, the entirety of which is hereby incorporated by reference.

BACKGROUND OF THE INVENTION

1. Field of the Invention

The present invention relates to a disk-storing disk device wherein multiple disks are stored within a casing.

2. Description of the Related Art

Japanese Unexamined Patent Application Publication No. 10-21627 (hereafter referred to as "known document") discloses a disk player device mounted in a dashboard of an automobile. Multiple information storing disks are stored within the disk player device, and are selected and played.

The disk player device uses rollers to transports disks toward a tray within the device. Multiple arms which are pressed in one direction by springs are provided within the device. When the disk is transported toward the tray, the perimeter of the disk engages the arms, and the arms turn against the pressing force of their springs. When the disk moves to a predetermined position over the tray, the multiple arms are all at positions which are removed from the perimeter of the disk by a gap.

Playing means having a pickup and a turntable are provided within the casing. Motive force of a motor is transmitted to a cam gear via a gear train, and the playing means are moved to a playing position by the rotational force of the cam gear. Synchronously with the movement of the playing means, restriction of a main chassis supporting the playing means is disengaged, and the main chassis and the playing means are supported in a vibration-proof manner within the device by an elastic supporting member such as antivibration rubber.

The disk player device described in the above known document is arranged such that the position of the disk stored on the tray, and the position of the disk played by the playing means, are the same.

Additionally, with the disk player device described in the above known document, the actions for disengaging the arms from the perimeter of the disk, moving the playing means to the playing position, and placing the main chassis in a vibration-proof state within the device by means of the elastic supporting member occur in individual actions. Accordingly, a significant amount of time is required from the time the disk is transported in to the tray to the time the disk is actually played. Further, individual motive forces are required for each action of disengaging the arms from the perimeter of the disk, moving the playing means to the playing position, and placing the main chassis in an vibration-proof state. Therefore, individual motive force generating means are necessary, increasing the difficulty in reducing the size of the disk player device. Accordingly, an improved disk-storing device is desirable.

SUMMARY OF THE INVENTION

The present invention has been made in light of the above-described problems. Accordingly, it is an object of the present invention to provide a disk-storing disk player with a reduced size where actions for transporting disks into rotation driving can be performed in a sure manner.

According to a first aspect of the present invention, a disk-storing disk device having a casing comprises: a driving unit having a rotational driving unit for rotating a disk; a plurality of supporting members which are capable of supporting a disk and which are disposed in a stacked manner in the axial direction of the disk; a supporting member selecting mechanism for spreading the spacing between a selected supporting member and another supporting member adjacent thereto; a motive force transmission mechanism for moving the driving unit from a retracted position away from the perimeter of a disk supported by one of the supporting members to an intervention position for clamping the disk supported by the supporting member with the rotational driving unit; a transporting mechanism for transporting a disk inserted from an insertion opening of the casing to the selected supporting member; a plurality of holding members provided to the supporting members, for holding a disk between the holding members and the supporting member; and a holding switchover mechanism for moving each of the holding members from a holding position for holding a disk to a holding disengaged position for disengaging holding of the disk; wherein following the driving unit being moved to the intervention position from the retraction position by the motive force of the transmission mechanism, the holding switchover mechanism is operated by the driving force of a driving source of the driving force transmission mechanism, whereby the holding members are moved from the holding position to the holding disengaged position.

With the first aspect of the present invention, the motive force for moving the driving unit to the intervention position is used to move the holding members to the holding disengaged position, so that moving of the driving unit to the intervention position and disengagement of holding of a disk held by a supporting member can be performed continuously and in a short time. The driving unit has moved to the intervention position whenever holding of the disk with the supporting member has been disengaged, so that the disk which has been released from holding by the supporting member does not fall down within the casing but rather can be securely held by the rotational driving unit of the driving unit.

With the first aspect of the present invention, following the driving unit having moved from the retracted position to the intervention position, a disk held by the selected supporting member may be clamped by the rotational driving unit, with the holding members being moved from the holding position to the holding disengaged position by subsequent motive force of the driving source.

Thus, the movement actions of the driving unit to the intervention position, the disk clamping action, and the disengaging of holding the disk with the holding member, can be performed continuously, and accordingly, the disk can be securely held by the rotational driving unit.

According to a second aspect of the present invention, a disk-storing disk device having a casing comprises: a driving unit having a rotational driving unit for driving a disk, and elastic supporting members by which the driving unit is elastically supported; a plurality of supporting members which are capable of supporting a disk and which are disposed in a stacked manner in the axial direction of the disk; a supporting member selecting mechanism for spreading the spacing between a selected supporting member and another supporting member adjacent thereto; a locking member for restricting elastic movement of the driving unit until a disk supported by the selected supporting member is clamped by the rotational driving unit; a motive force transmission mechanism for moving the locking member from a restricting position where elastic movement of the driving unit is restricted to a restriction disengaged position where the restriction is disengaged; a transporting mechanism for transporting a disk inserted from an insertion opening of the casing to the selected supporting member; a plurality of holding members provided to the supporting members, for holding a disk between the holding members and the supporting member; and a holding switchover mechanism for moving each of the holding members from a holding position for holding a disk to a holding disengaged position for disengaging holding of the disk; wherein the holding members are moved to the holding disengaged position from the holding position by the motive force of the motive force transmission mechanism, and the holding switchover mechanism is operated by the driving force of a driving source, whereby the locking member are moved from the restricting position to the restriction disengaged position.

With the second aspect of the present invention, the actions for disengaging restriction of the driving unit which is elastically supported, and disengaging holding of the disk by the holding member can be timed so as to be carried out as a series of actions.

With the second aspect of the present invention, at the time of the locking member being moved from the restricting position to the restriction disengaged position, the motive force of the driving source may be directly transmitted from the locking member to the holding switchover mechanism, with the locking member being moved to the restriction disengaged position.

Directly transmitting the motive force from the locking member to the holding switchover mechanism provides high-precision timing of the moving actions of the locking member and the disengaging of the holding of the disk by the holding member. The timing of the moving actions reduces the amount of stress being placed on a disk, due to a supporting member continuing to support the disk clamped by the rotational driving unit of the driving unit in an elastically-supported state.

With the second aspect of the present invention, there may be further provided a rack portion formed on the locking member, and a linking gear disposed within the casing, for meshing with the rack portion, with the holding switchover mechanism being operated by the linking gear.

With the first and second aspects of the invention, there may be further provided a side wall of the casing and a holding switchover member moving along the side wall. The holding switchover member operates with the holding switchover mechanism. The holding members are at a position facing the side wall of the casing and are moved to the holding disengaged position by the moving force of the holding switchover member.

Moving the holding switchover members along the side wall of the casing allows the space through which the holding switchover members moves within the casing to be reduced, thereby reducing the size of the casing.

With the second aspect of the invention, there may be further provided first and second side walls of the casing, and first and second holding switchover members moving along the side walls. The holding switchover members operate with the holding switchover mechanism, with the first holding member of the holding members being at a position facing the first side wall of the casing, and the second holding member of the holding members being at a position facing the second wall of the casing. The first holding switchover member on an inner side of the first side wall and the second holding switchover member on the inner side of the second side of the wall move the first and second holding members to the holding disengaged position.

With the second aspect of the invention, there may be further provided: a second switchover driving member reciprocally driven by the motive force of the driving source and a reversal transmission lever for reversing the moving force of the second switchover driving member to the second holding switchover member. The second switchover driving member may be disposed on the inner side of the second side wall. In this implementation, the first holding member is positioned to face the first side wall of the casing, and the second holding member is positioned to face the second wall of the casing such that the first and second holding member move to the holding disengaged position by turning in mutually opposite directions.

In this case, there may be further provided: a first switchover driving member, disposed on the inner side of the first side wall, for driving the first holding switchover member; a ceiling face of the casing; and a linking turning plate provided on the ceiling face; with the moving force of the second switchover driving member being transmitted to the first switchover driving member by the linking turning plate.

Due to the switchover driving members and switchover holding members operating along the side walls of the casing, and the linking turning plate turning along the ceiling face, mechanisms provided on the two side walls can operate synchronously, thereby reducing the size of the casing.

With the disk-storing disk device according to the present invention, actions for transporting disks into rotational driving can be performed in a sure manner, and the size of the casing can be reduced due to the shared driving source among the mechanisms.

BRIEF DESCRIPTION OF THE DRAWINGS

FIGS. 2A and 2B are frontal views of one embodiment of the casing of the disk-storing disk device, wherein FIG. 2A illustrates a transportation unit within the casing, and FIG. 2B illustrates a supporting member selecting mechanism and driving unit;

It should be noted that FIGS. 16 through 20 are perspective views illustrated with the left and right sides (X1 side and X2 side) of the upper casing inverted 180°.

DETAILED DESCRIPTION OF THE DRAWINGS

Overall Configuration

Figure 1:
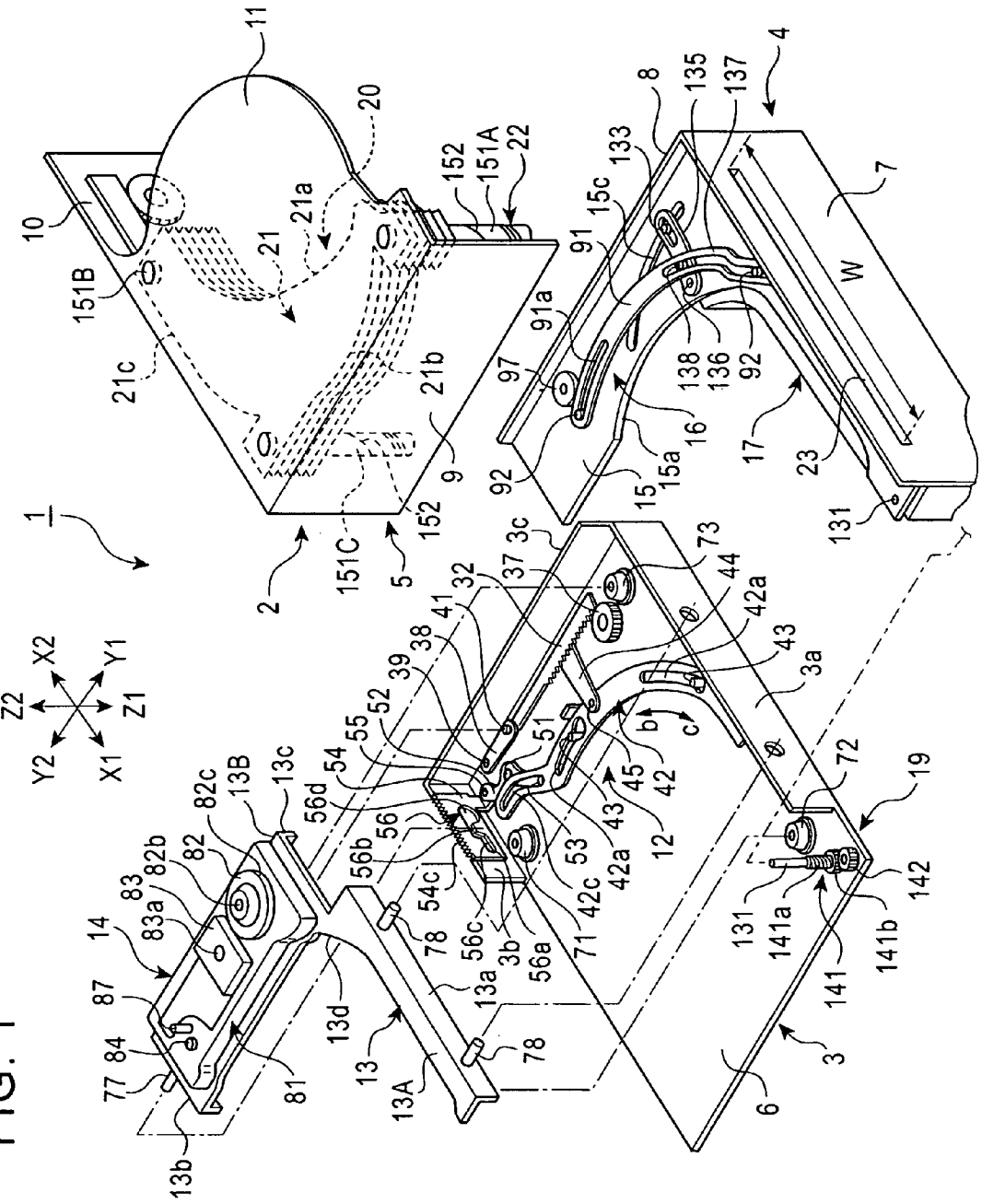
FIG. 1 is a disassembled perspective view illustrating one embodiment of the overall configuration of a disk-storing disk device.

A disk-storing disk device 1 shown in FIG. 1 has a box-shaped casing 2. The reference directions of this casing 2 are as follows: the Z1 side is the lower side, the Z2 side is the upper side, the X1 side is the left side, the X2 side is the right side, the Y1 side is the near side, and the Y2 side is the far side. Further, the X1-X2 direction is the horizontal direction, and the Y1-Y2 direction is the vertical direction.

The casing 2 includes a lower casing 3, middle casing 4, and upper casing 5 being stacked from the bottom up in that order. The lower casing 3 has a base face 6 of the casing 2, and the middle casing 4 has a front face 7 and right side face 8 of the casing 2. The upper casing 5 has a left side face 9 and rear side face 10 and ceiling face 11.

A first motive force transmission mechanism 12 is provided on the upper face of the base face 6 of the lower casing 3. A unit supporting base 13 is supported above the first motive force transmission mechanism 12, and a driving unit 14 is mounted on the unit supporting base 13. A mechanism base 15 parallel to the base face 6 is provided to the upper part of the middle casing 4, and a second motive force transmission mechanism 16 is provided above the mechanism base 15. In the middle casing 4, a transporting unit (transporting mechanism) 17 is provided below the mechanism base 15 and on the inner side of the front face 7. A third motive force transmission mechanism 19 is provided between the edge of the left side (X1 side) of the transporting unit 17 and the base face 6 of the lower casing 3. The third motive force transmission mechanism 19 functions as roller driving means.

At the upper casing 5, a region defined by the left side face 9, rear side face 10, and ceiling face 11 serves as a disk storing region 20. The disk storing region 20 includes multiple supporting members 21, each capable of supporting a disk D. In one embodiment, there are six supporting members 21 provided, with the supporting members 21 being stacked in the axial direction. A supporting member selecting mechanism 22 is provided to the upper casing 5. The supporting member selecting mechanism 22 operates such that one of the size supporting members 21 is selected and moved to a selection position (a) shown in FIG. 2B, and the gap between the selected supporting member 21 and the supporting member 21 adjacent thereto below is spread.

Figure 2A:
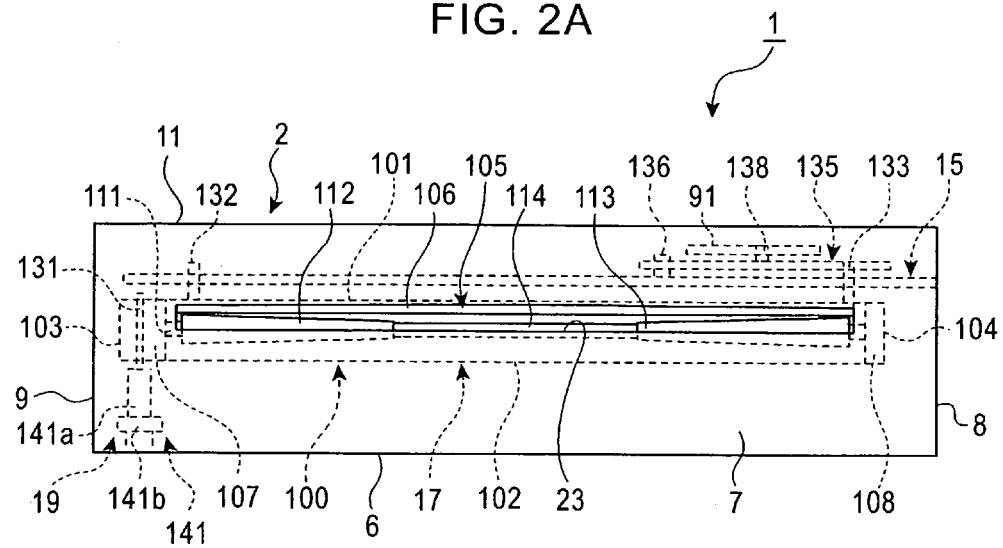
Figure 2B:
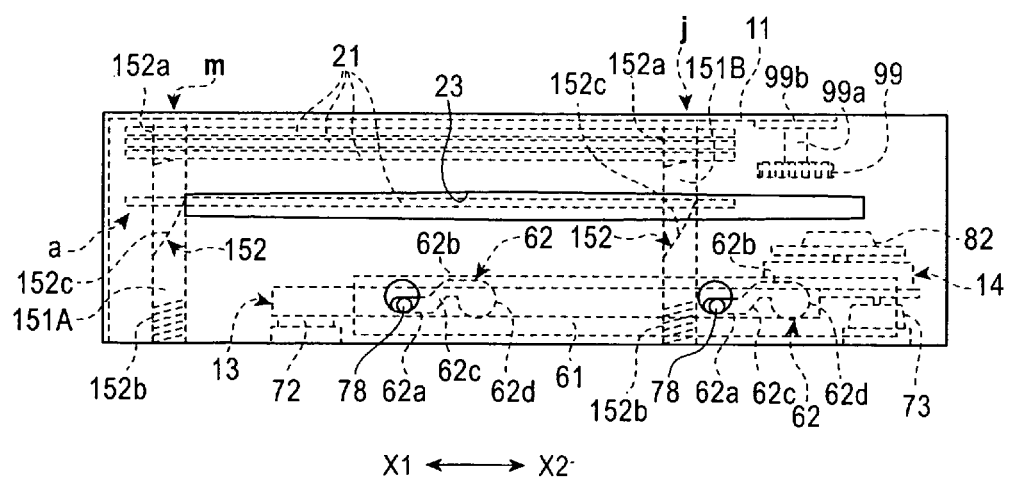

The disk D has a diameter of 12 cm, and is for example, a CD (compact disk), CD-ROM, DVD (digital versatile disk), or the like. As shown in FIGS. 2A and 2B, an insertion opening 23 is formed on the front face 7 of the casing 2. The insertion opening 23 is formed as a slit, with the vertical dimensions being slightly larger than the thickness dimensions of the disk D. The opening width dimensions W in the horizontal direction is typically slightly greater than the diameter of the disk D.

As shown in FIG. 2A, the transporting unit 17 is positioned at the same height as the insertion opening 23. A disk D inserted at the insertion opening 23 is transported to the disk storing region 20 by the transporting unit 17. As shown in FIG. 2B, of the multiple supporting units 21, the supporting unit 21 which has reached the selection position (a) attains the same height as the insertion opening 23. The disk D inserted from the insertion opening 23 is transported by the transporting unit 17 and is supported to the lower face (Z1 side face) of the supporting member 21 at the selection position (a).

Figure 12:
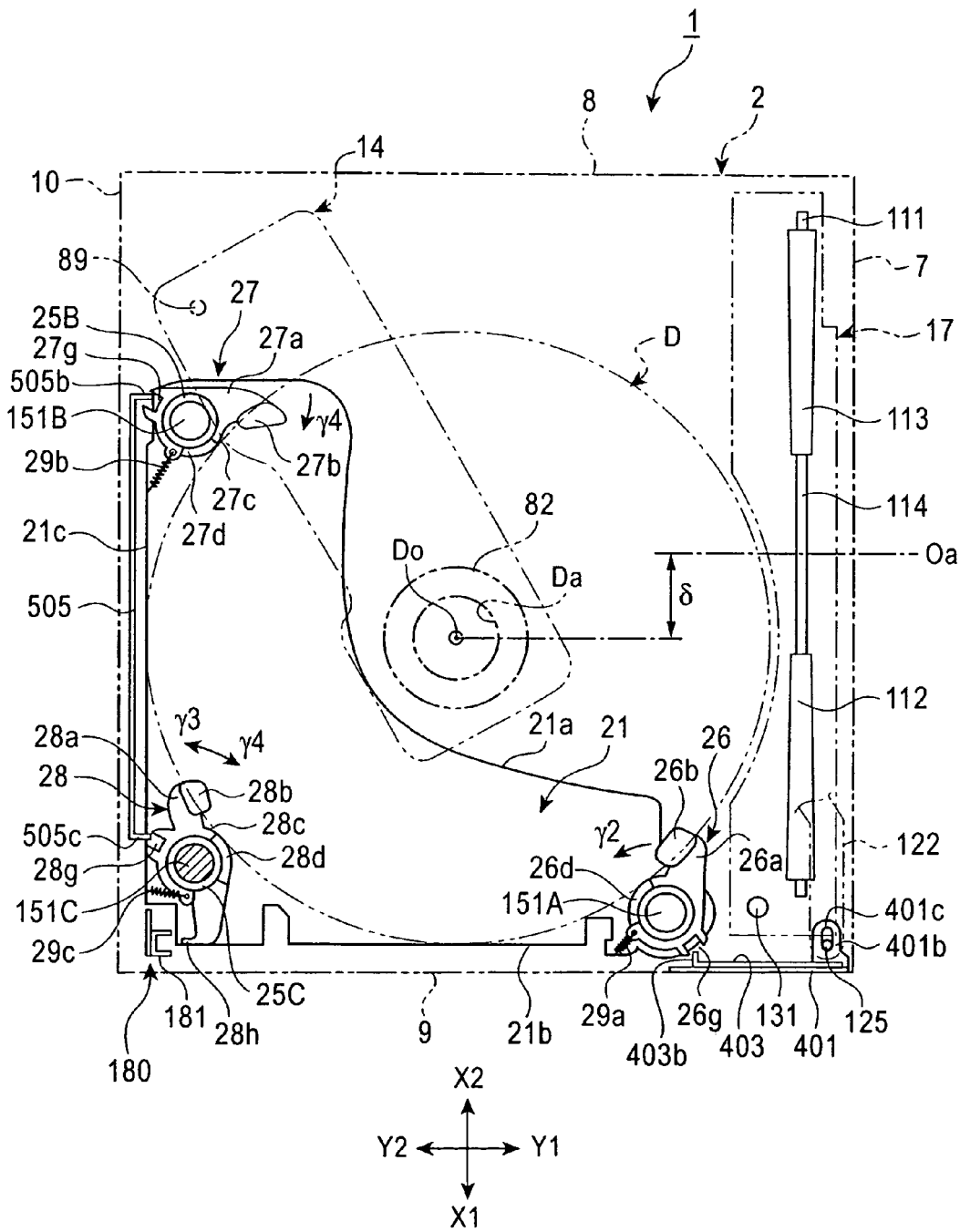

FIG. 12 is a plane drawing viewing the casing 2 from the ceiling face 11 side. An imaginary line which bisects the width dimensions W of the insertion opening 23 formed on the front face 7 of the casing 2, and which is orthogonal to the front face 7, and extends inward in the casing 2, is taken as an insertion center line Oa. The center D0 of the disk D supported by the supporting member 21 within the disk supporting region 20 is at a position shifted toward the left side (X1 side) from the insertion center line Oa by a distance of δ. The distance δ is 1/10 of the diameter of the disk D or greater.

Figure 6:
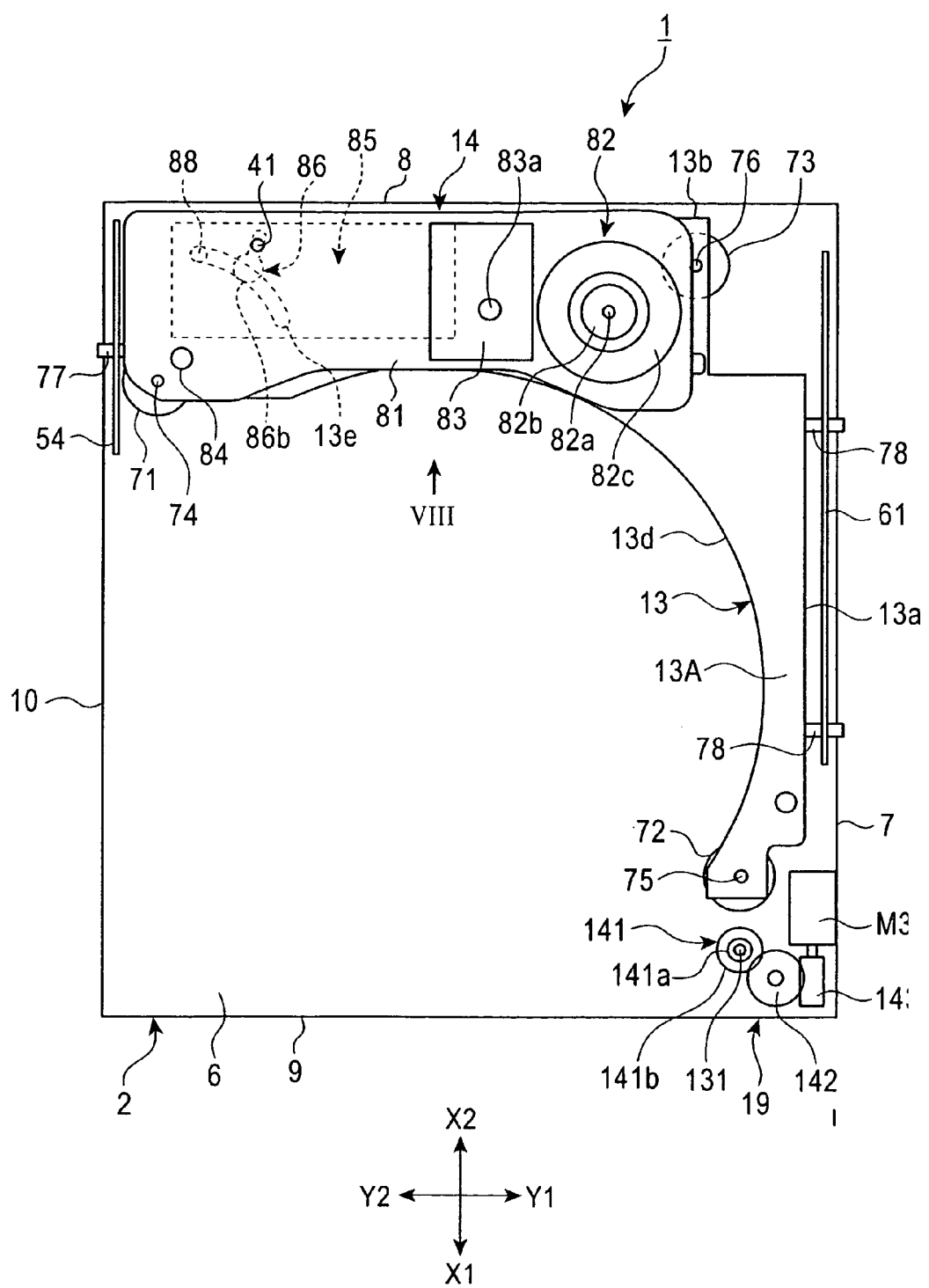
FIGS. 6 and 7 are plan views illustrating one embodiment of the driving unit and unit supporting base.
Figure 8:
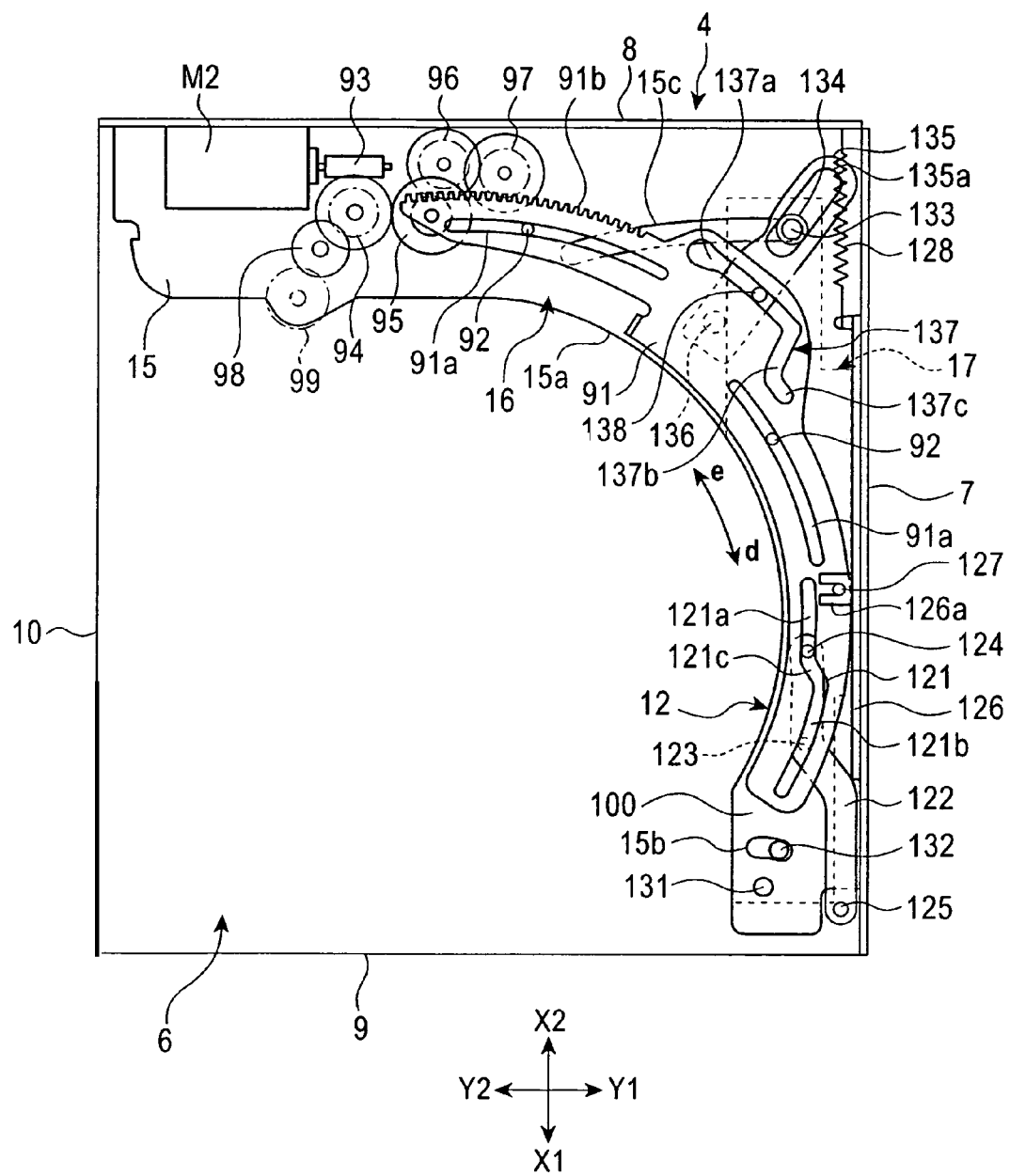
FIGS. 8 and 9 are plan views illustrating configurations of one embodiment of a second motive force transmission mechanism, according to actions.
Figure 13:
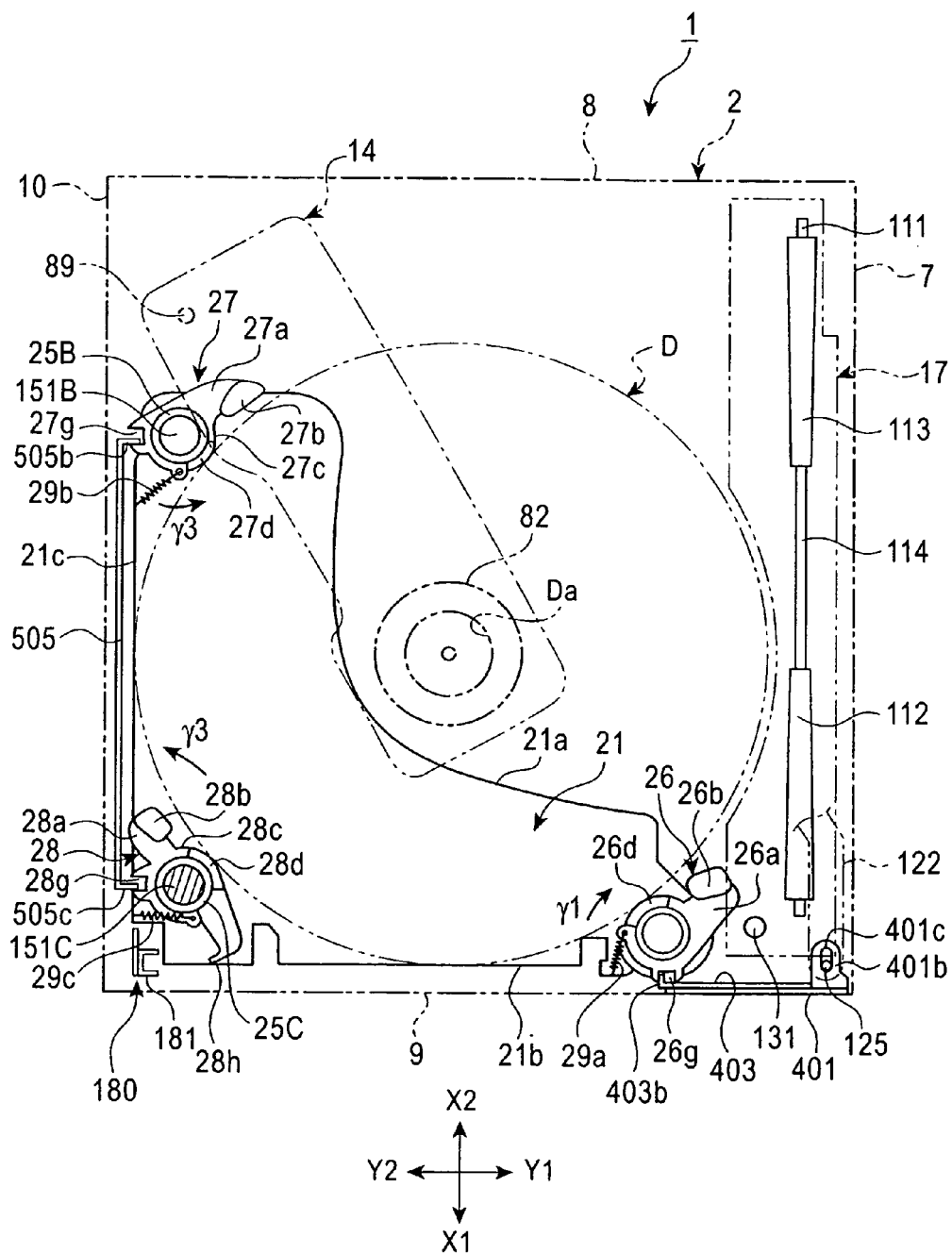

In FIG. 6, the driving unit 14 is shown at a retracted position. The driving unit 14 at this time is positioned immediately inside of the right side face 8 at a position away from the insertion center line Oa to the right side (X2 side), placing the driving unit 14 at a position slightly removed from the perimeter of the disk D supported by the supporting member 21. FIGS. 8, 12, and 13 show the transporting unit 17 in a standby position. The transporting unit 17 at this time is at a position immediately on the inside of the front face 7 and at a position slightly removed from the perimeter of the disk D supported by the supporting member 21.

Figure 11:
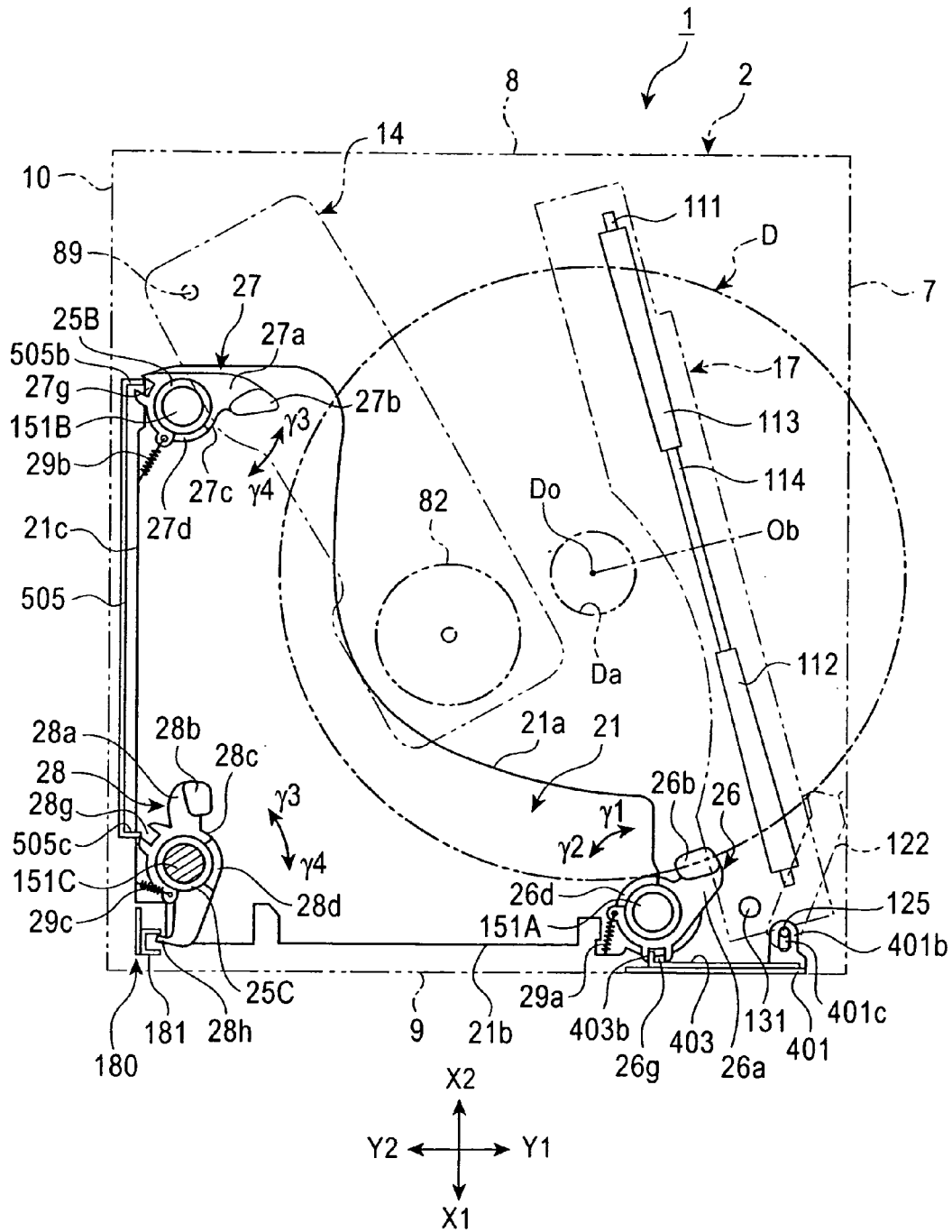
FIGS. 11 through 13 are plan views illustrating actions of transporting a disk, and holding a disk with a supporting member.

As shown in FIG. 11, the driving unit 14 turns in the clockwise direction within the casing 2 to reach an intervention position, and the transporting unit 17 turns in the counter-clockwise direction to reach the transporting action position. There is a portion within the casing 2 wherein the turning region of the driving unit 14 and the turning region of the transporting unit 17 overlap. However, as shown in FIG. 11, when the driving unit 14 turns in the clockwise direction to stop at the intervention position, the transporting unit 17 operates to turn between the retracted position and the transporting action position, so that the driving unit 14 and the transporting unit 17 never collide. Arranging the disk storing region 20, driving unit 14, and transporting unit 17 in this way provides efficient use of the inner space of the casing 2. Within the casing 2, the arrangement is such that the transporting unit 17 is at the near side and the disk storing region 20 is provided at the far side, to reduce the depth-wise dimensions of the casing 2. In one embodiment, the depth-wise dimensions of the casing 2 (Y1-Y2 direction dimensions) are below the so-called 1 DIN size.

The mechanism base 15 of the middle casing 4 shown in FIG. 1 is positioned above the driving unit 14 and the transporting unit 17. An inner edge 15a of the mechanism base 15 facing the inner side of the casing 2 (the X1 direction in the drawing) is at a position slightly removed from the perimeter of the disk D supported by the supporting member 21 of the disk storing region 20. Accordingly, as shown in FIG. 2B, the supporting member 21 situated at the topmost position of the disk storing region 20 is capable of elevating to the proximity of the inner side of the ceiling face 11 of the casing 2.

First Motive Force Transmission Mechanism

The structure of the first motive force transmission mechanism 12, disposed on the base face 6 of the casing 2, will be described with reference to FIGS. 3 through 5.

As shown in FIG. 1, at the front of the lower casing 3 is a front bent piece 3a bent perpendicularly from the base face 6.

Similarly, at the back is a back bent piece 3b, and at the right side is a right side bent piece 3c, bent perpendicularly from the base face 6.

Figure 3:
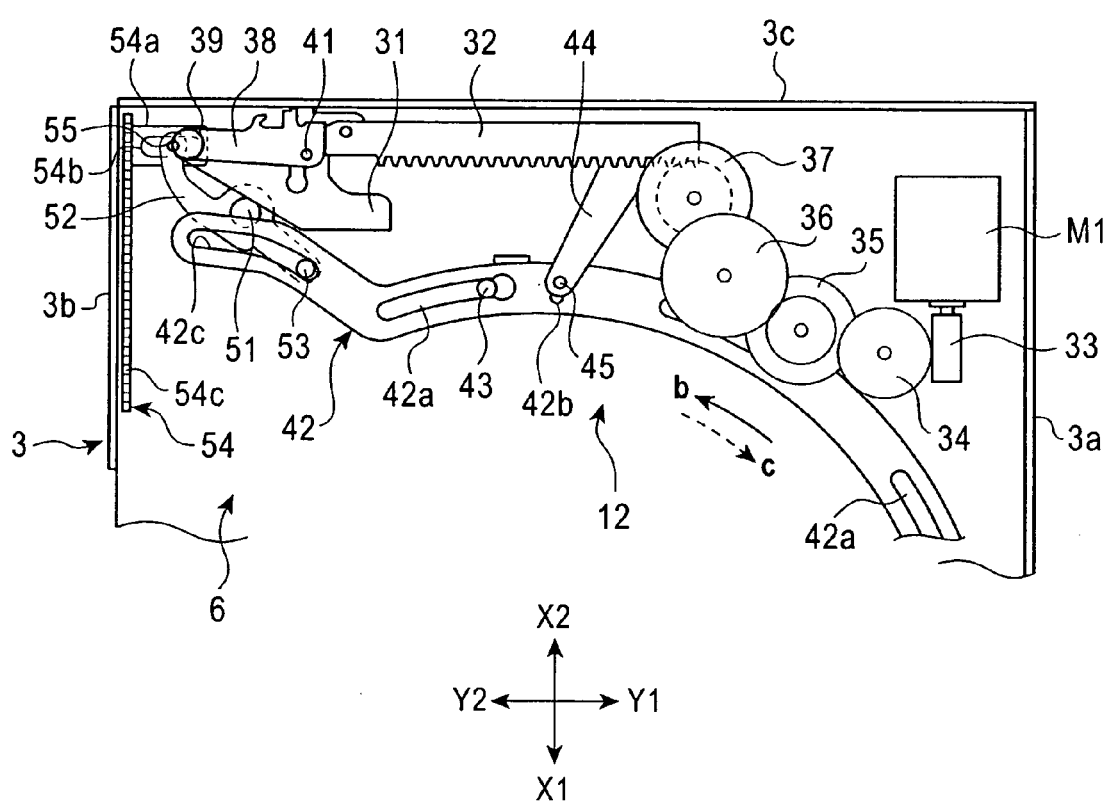
FIGS. 3 through 5 are plan views illustrating configurations of one embodiment of a first motive force transmission mechanism situated on the based of the casing.

As shown in FIG. 3, the first motive force transmission mechanism 12 has provided on the base face 6 a slider 31 which linearly moves in the Y1-Y2 direction, and a rack member 32 which moves the slider 31 via an unshown linking member. Fixed on the near side of the base 6 is a first motor M1, which is the driving source of the first motive force transmission mechanism 12, and a worm gear 33 that is fixed on the output shaft of the first motor M1. The rotational force of the first motor M1 is transmitted to a pinion gear 37 via reduction gears 34, 35, and 36. The pinion gear 37 meshes with the teeth of the rack member 32.

A switchover lever 38 is provided upon the slider 31. The far end (at the Y2 side) of the switchover lever 38 is turnably supported on the slider 31 by a shaft 39. A switchover driving pin 41 protrudes upwards at the near end (Y1 side) of the switchover lever 38. An attitude control pin extending downward concentrically with the switchover driving pin 41 is provided on the switchover lever 38, and the attitude control pin is inserted into an unshown cam groove formed on the base face 6. When the switchover lever 38 moves in the Y1 direction along with the slider 31, the switchover lever 38 performs a turning action following the shape of the cam groove.

A lock switchover member 42 is provided on the base face 6. This lock switchover member 42 is a metal plate of which the planar shape has an arced form, with two arc-shaped sliding slots 42a formed thereupon. As also shown in FIG. 1, two guide pins 43 are erected on the base face 6, and each of the guide pins 43 are inserted into a sliding slot 42a. Sliding the sliding slots 42a over the guide pins 43 enables the lock switchover member 42 to be slid in a (b) direction which is the far side of the casing 2, and a (c) direction which is the near side of the casing 2, following an arc-shaped course.

A linking turning lever 44 is turnably supported on the base face 6. The linking turning lever 44 and the rack member 32 are lined via a cam unit (not shown), and the linking turning lever 44 is turned in the counter-clockwise direction in a two-stage action as the rack member 32 proceeds in the Y1 direction. A linking slot 42b is formed on the lock switchover member 42 extending on the width direction thereof, with a linking pin 45 formed on the tip of the linking turning lever 44 being inserted into the linking slot 42b. As shown in FIG. 5, the lock switchover member 42 is moved in the (c) direction by the turning force of the linking turning lever 44 when the linking turning lever 44 is turned in the counter-clockwise direction by the moving force of the rack member 32 in the Y1 direction.

A switchover slot 42c is formed at the end of the lock switchover member 42 at the far end (Y2 side). A transmission member 52 turnably supported by a shaft 51 is provided at the far side of the base face 6. A linking pin 53 is fixed on the near side end of the transmission member 52, and the linking pin 53 is inserted into the switchover slot 42c.

As shown in FIG. 1 as well, a locking member 54 is provided on the inner side of the back bent piece 3b. This locking member 54 is plate shaped, and is supported so as to be capable of linear motion in the X1-X2 direction on the inner side of the back bent piece 3b. A lower rack portion 54c is formed on the upper edge portion of the locking member 54.

As shown in FIGS. 1 and 3, the locking member 54 is provided with a bent piece 54a bent from the lower edge thereof toward the base face 6. A slot 54b is formed in the bent piece 54a. A linking pin 55 is fixed on the far end of the transmission member 52, and the linking pin 55 is inserted in the slot 54b. At the time of the lock switchover member 42 moving from the position shown in FIG. 4 in the (c) direction, the transmission member 52 is turned in the counter-clockwise direction by the switchover slot 42c, thereby moving the locking member 54 in the X1 direction.

As shown in FIG. 1, the locking member 54 has opened therein a lock control hole 56. The lock control hole 56 has a restricting portion 56a formed at a position approaching the base face 6 at the X1 side, a raising portion 56b which is positioned further toward the X2 side from the restricting portion 56a and which is positioned above the restricting portion 56a, and an inclined portion 56c interconnecting the restricting portion 56a and the raising portion 56b. Further, a relatively large-sized circular escape hole 56d is formed at the X2 side end of the raising portion 56b.

A locking member 61 is also provided on the inner side of the back bent piece 3a of the lower casing 3. This locking member 61 is shown in FIG. 2B. The locking member 61 is linked to the lock switchover member 42, and is supported so as to be capable of linear sliding motion in the X1-X2 direction on the inner side of the front bent piece 3a. As shown in FIGS. 1 and 3, at the time of the lock switchover member 42 moving in the (b) direction, the locking member 61 is positioned at the X2 side as shown in FIG. 2B, and when the lock switchover member 42 moves in the (c) direction, the locking member 61 is moved in the X1 direction by the moving force of the lock switchover member 42.

As shown in FIG. 2B, the locking member 61 has opened therein a pair of lock control holes 62. The lock control holes 62 each have a restricting portion 62a formed at a position approaching the base face 6 at the X1 side, a raising portion 62b which is positioned further toward the X2 side from the restricting portion 62a and which is positioned above the restricting portion 62a, and an inclined portion 62c interconnecting the restricting portion 62a and the raising portion 62b. Further, a relatively large-sized circular escape hole 62d is formed at the X2 side end of the raising portion 62b.

Now, description will be made regarding the actions of the first motive force transmission mechanism 12. As shown in FIGS. 1 through 3, when the rack member 32 has moved to the starting end at the far side (Y2 side), the slider 31 and the switchover lever 38 are positioned at the Y2 side. At this time, the linking turning lever 44 has turned in the clockwise direction and the lock switchover member 42 has moved in the (b) direction. The locking member 54 shown in FIG. 1 and the locking member 61 shown in FIG. 2B have both moved to the X2 side.

Figure 4:
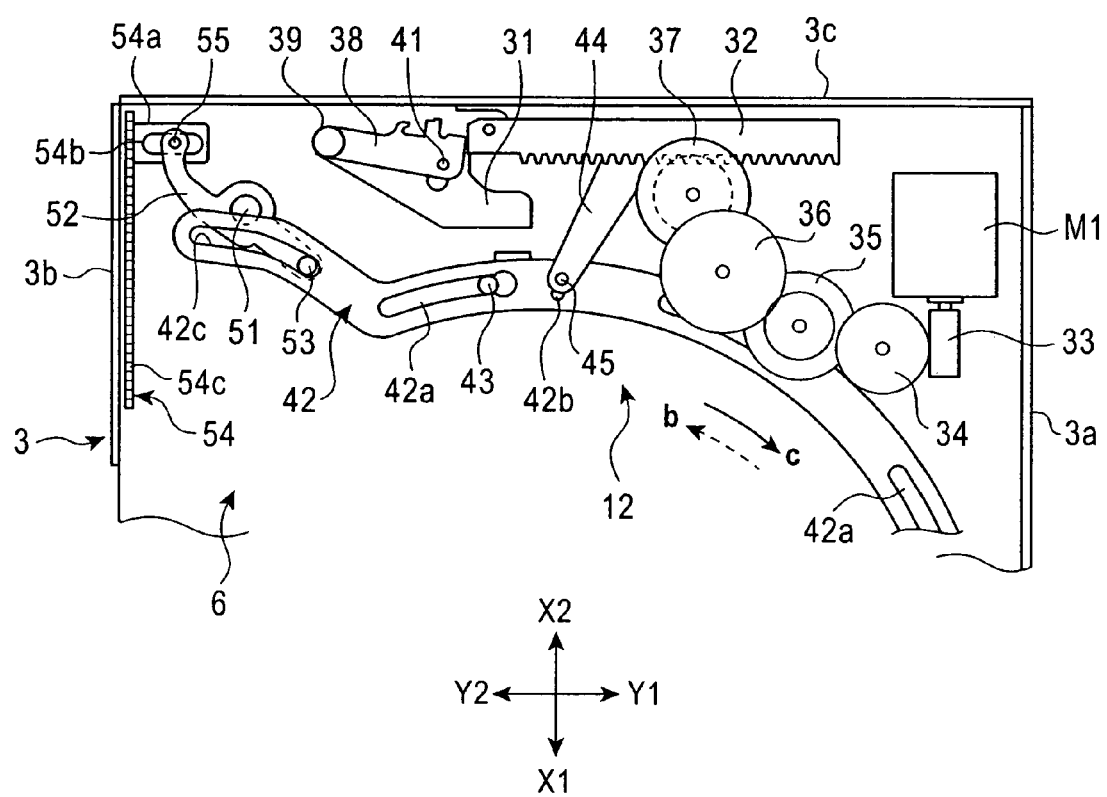

While the motive force of the first motor M1 moves the rack member 32 in the Y1 direction from the position shown in FIG. 3, up to the position shown in FIG. 4, the slider 31 and the switchover lever 38 move together with the rack member 32 in the Y1 direction as shown in the drawing. At the final step thereof, the switchover lever 38 is turned somewhat clockwise. However, while the rack member 32 is moving from the position in FIG. 3 to the position shown in FIG. 4, the linking turning lever 44 is not turned, and the lock switchover member 42 is stopped at the position moved in the (b) direction and does not move in the (c) direction.

When the rack member 32 moves a short distance in the Y1 direction from the position shown in FIG. 4, the slider 31 and the switchover lever 38 do not move from the position shown in FIG. 4 due to the controlling actions of an unshown linking member linking the slider 31 and the rack member 32, and the controlling actions of an unshown cam groove formed in the base face 6. The linking turning lever 44 is turned in the counter-clockwise direction, and the lock switchover member 42 is moved in the (c) direction, so that the locking member 54 and the locking member 61 are moved in the X1 direction by a distance equivalent to approximately half the overall movement range.

Figure 5:
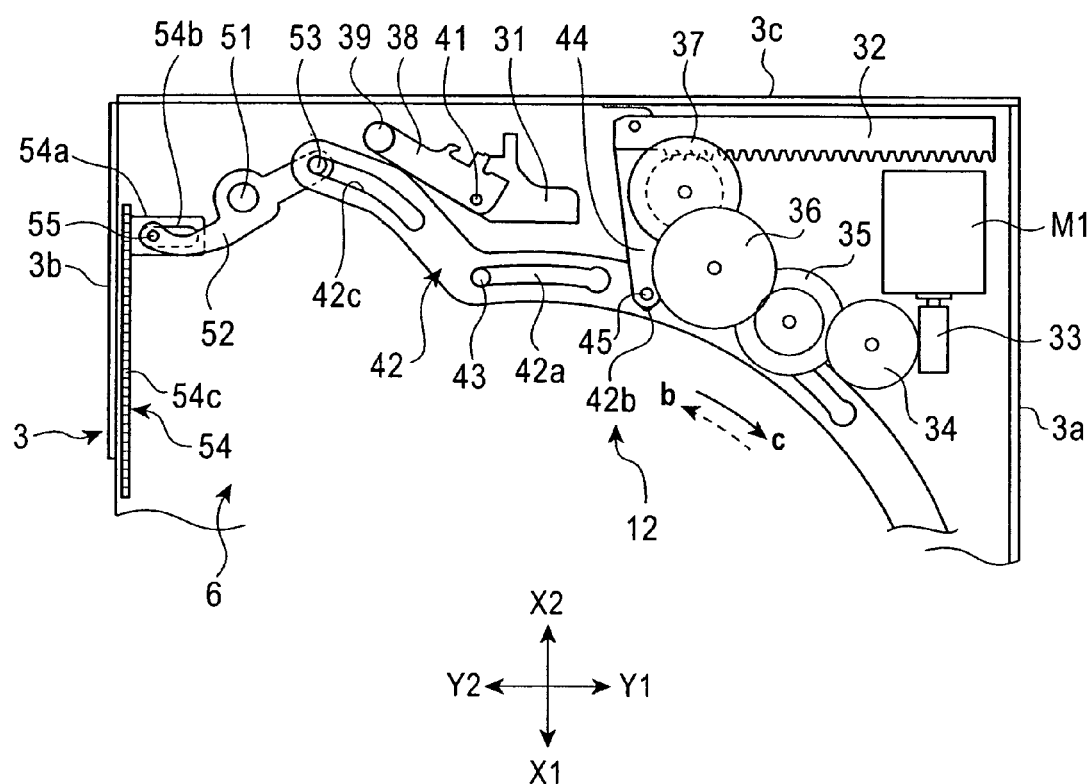

Prior to the rack member 32 moving in the Y1 direction and reaching the position shown in FIG. 5, the linking turning lever 44 does not turn and the slider 31 and the switchover lever 38 moves in the Y1 direction. Thereafter, the slider 31 and the switchover lever 38 do not move in the Y1 direction any further, and the linking turning lever 44 turns in the counter-clockwise direction, and as shown in FIG. 5, the lock switchover member 42 is slid in the (c) direction. Upon the lock switchover member 42 turning in the direction shown in FIG. 5, locking member 54 moves to the final position in the X1 direction, and locking member 61 moves to the final position in the X1 direction. Prior to the lock switchover member 42 reaching the position shown in FIG. 5, the switchover lever 38 on the slider 31 turns by a great amount in the clockwise direction.

Unit Supporting Base and Driving Unit

The unit supporting base 13 shown in FIG. 1 is formed by bending a metal plate. A front bent piece 13a is provided on the near side of the unit supporting base 13, with this front bent piece 13a being disposed parallel to the inner side of the front bent piece 3a of the lower casing 3. A back bent piece 13b is provided on the unit supporting base 13, with this back bent piece 13b being disposed parallel to the inner side of the back bent piece 3b of the lower casing 3. Also, a side bent piece 13c of the unit supporting base 13 is disposed parallel to the inner side of the right side bent piece 3c of the lower casing 3.

Figure 7:
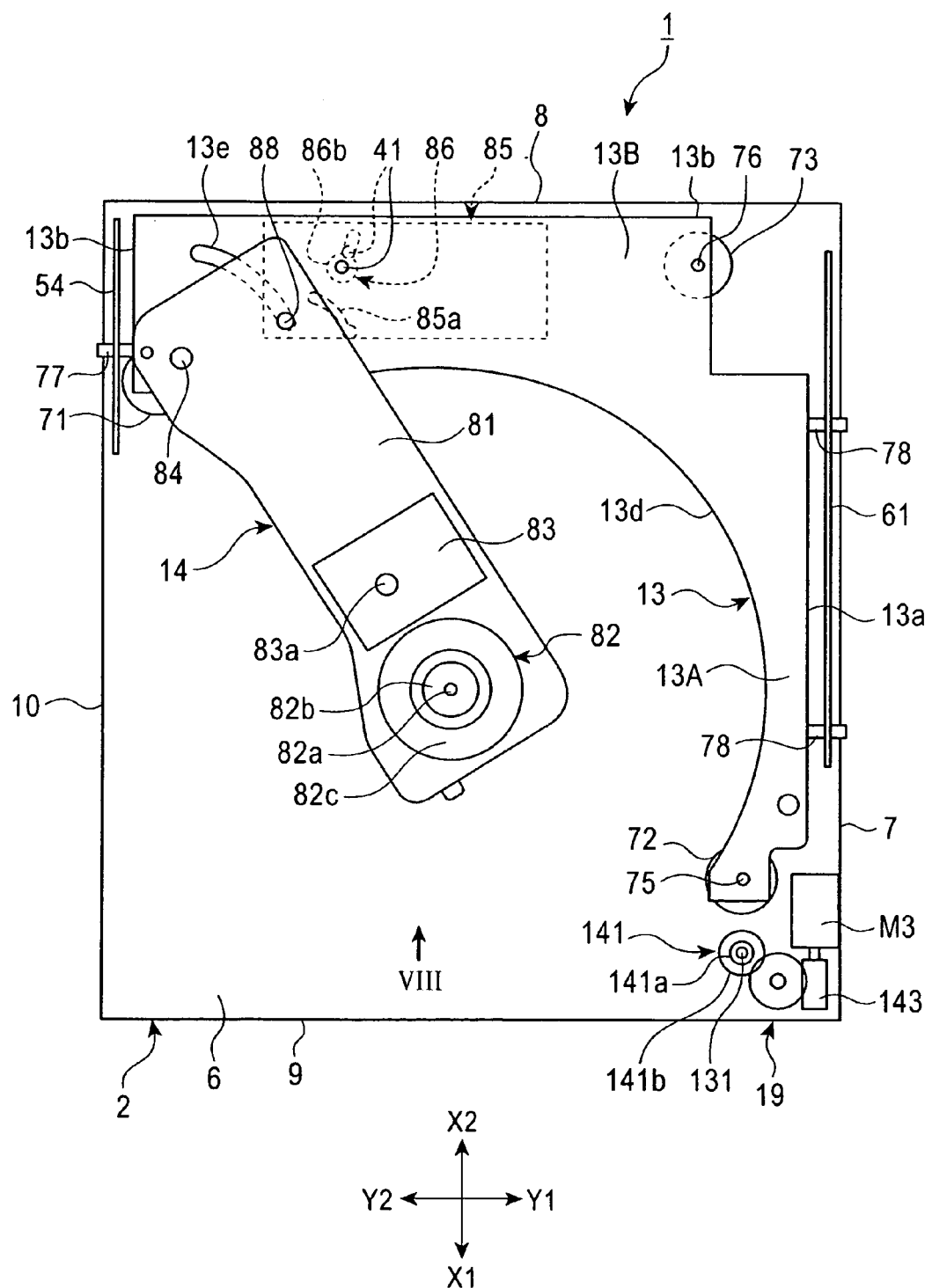

As shown in FIGS. 6 and 7, an inner edge 13d of the unit supporting base 13 is formed in a recessed arc shape, with the inner edge 13d being at a position slightly away from the edge of a disk D supported by a supporting member 21 in the disk storing region 20 shown in FIG. 1.

As shown in FIGS. 1, 6, and 7, dampers 71, 72, and 73, which are elastic supporting members, are fixed at three positions on the base face 6 of the lower casing 3. The dampers 71, 72, and 73 are formed by a liquid such as oil or the like, or a gas, being sealed within a flexible pouch formed of rubber of the like. Alternatively, a compression coil spring may be used in combination with the pouch.

As shown in FIGS. 6 and 7, supporting shafts 74, 75, and 76 are vertically fixed at three positions on the base face of the unit supporting base 13 extending downwards. Supporting shaft 74 is supported by the damper 71, the supporting shaft 75 is supported by the damper 72, and the supporting shaft 76 is supported by the damper 73. The unit supporting base 13 can be elastically supported above the base face 6 by the dampers 71, 72, and 73.

A restricting shaft 77 protruding in the Y2 direction is provided on the back bent piece 13b of the unit supporting base 13, with the restricting shaft 77 inserted into the lock control hole 56 of the locking member 54 shown in FIG. 1. A pair of restricting shafts 78 protruding in the Y1 direction is provided on the front bent piece 13a of the unit supporting base 13, with each of the restricting shafts 78 inserted into the lock control holes 62 of the locking member 61 shown in FIG. 2B.

As shown in FIGS. 6 and 7, the driving unit 14 has a slender driving base 81. A supporting shaft 84 vertically protrudes upwards at the far side (Y2 side) of the unit supporting base 13, and the driving base 81 is supported by the supporting shaft 84 such that the driving unit 14 is callable of turning along the X-Y plane.

The turning range of the driving unit 14 is from the retracted position shown in FIG. 6 to the intervention position shown in FIGS. 7 and 11 through 13. As shown in FIG. 6, when the driving unit 14 is at the retracted position, a turntable 82, which is a rotational driving unit, situated on the turning end of the driving unit 14, is situated at the front face 7 side of the casing 2, and the side of the driving base 81 is situated so as to be parallel with the right side face 8 of the casing 2 in close proximity therewith. The driving unit 14 in the retracted position is slightly away from the perimeter of the disk D supported by the supporting member 21 in the disk storage region 20.

As shown in FIGS. 7 and 11 through 13, upon the driving unit 14 turning to the intervention position, the turntable 82 moves to within the disk storage region 20. At the intervention position, the rotational center of the turntable 80 moves to the selection position (a) and matches the center hole of the disk D supported by the supporting member 21 beneath the center hole of the disk D.

As shown in FIG. 6, an arc guide portion 13e formed in an arc shape with a predetermined radius centered on the supporting shaft 84 is provided on the unit supporting base 13. This arc guide portion 13e is an arc-shaped slot which penetrates the unit supporting base 13. Also, a driving shaft 88 is vertically fixed on the lower face of the driving base 81 of the driving unit 14, and this driving shaft 88 is movably inserted into the arc guide portion 13e.

As shown in FIG. 6, a driving slider 85, which is a driving member, is provided on the lower face of the unit supporting base 13. The driving slider 85 is slidably supported so as to move in the Y1-Y2 direction. A driving link mechanism for driving the driving shaft 88 is disposed between the driving slider 85 and the unit supporting base 13. During the rack member 32 moving from the starting end at the Y2 side, shown in FIG. 3, toward the Y1 direction to the position shown in FIG. 4, the driving shaft 88 is pressed in the clockwise direction by the driving link mechanism, and the driving unit 14 is turned from the retracted position shown in FIG. 6 to the intervention position shown in FIG. 7.

A spindle motor is disposed on the turning end of the driving base 81 of the driving unit 14, with the turntable 82 fixed to a motor shaft 82a of the spindle motor. As shown in FIG. 1 as well, the turntable 82 has a center protrusion portion 82b which enters a center hole Da of the disk D, and a flange portion 82c extending from the center protrusion portion 82b toward the perimeter. A clamp mechanism is disposed within the turntable 82. This clamp mechanism has clamping claws radially protruding from the center protrusion portion 82b. When the claming claws are retracted within the center protrusion portion 82b, the clamp mechanism is in a non-clamping mode. When the clamp mechanism is in a non-clamping mode, the center protrusion portion 82b can enter the center hole Da of the disk D. When the clamping claws are protruded, the clamp mechanism is in a clamping mode. When the clamp mechanism is in a clamping mode, the perimeter of the center hole Da of the disk D is clamped between the clamping claws and the flange portion 82c, so that the disk D is clamped to the turntable 82.

The driving base 81 of the driving unit 14 has a clamping switchover mechanism for operating the clamping claws. Following the rack member 32 moving to the position shown in FIG. 4 and the driving unit 14 moving to the intervention position, the rack member 32 moves in the Y1 direction and the driving slider 85 moves in the Y1 direction, the driving force of which causes the clamping claws of the clamping switchover mechanism to switch from the non-clamping mode to the clamping mode.

As shown in FIGS. 6 and 7, an optical head 83 is provided to the driving base 81, with an object lens 83a disposed on the upper face of the optical head 83. A thread mechanism is provided on the driving base 81, which acts to move the optical head 83 from a position near to the turntable 82 away from the turntable 82. At this time, the object lens 83a of the optical head 83 can move in the radial direction of the disk D clamped to the turntable 82.

Second Motive Force Transmission Mechanism

The second motive force transmission mechanism 16 provided on the middle casing 4 will be described with reference to FIGS. 8 and 9. With the second motive force transmission mechanism 16, an arc-shaped switchover member 91 is provided above the mechanism base 15 of the middle casing 4. The switchover member 91 has formed thereupon a pair of guide slots 91a which extend following an arc course. A pair of guide shafts 92 is fixed protruding upwards from the mechanism base 15, with each of the guide shafts 92 being inserted in a respective guide slot 91a. Thus supporting mechanism allows the switchover member 91 to be slidably guided in the (d) direction and the (e) direction following the arc course. Further, rack teeth 91b are formed following the act course on the edge of the perimeter of the switchover member 91.

A second motor M2 is provided on the mechanism base 15. A worm gear 93 is fixed on the rotational shaft of the second motor M2. An output gear 94 is provided on the mechanism base 15, and the worm gear 93 meshes with the output gear 94.

The rotational motive force of the second motor M2 is output from the output gear 94, reduced by gears 95 and 96, and transmitted to a pinion gear 97. Note that the gear 95 is a first switchover gear which moves between a position of meshing with the output gear 94 and a position disengaged from the output gear 94. The pinion gear 97 meshes with rack teeth 91b of the switchover member 91. Also, a second switchover gear 98 is provided to the side of the output gear 94. The second switchover gear 98 is for transmitting motive force of the second motor M2 to the supporting member selecting mechanism 22 shown in FIG. 1. Provided on the mechanism base 15 are means for separating the second switchover gear 98 from the output gear 94 in the event that the first switchover gear 95 is meshing with both the output gear 94 and the gear 96, and for meshing the second switchover gear 98 with both the output gear 94 and a later-described transmission gear 99 when the first switchover gear 95 has separated from the output gear 94. The switchover means are operated by the motive force of the first motor M1. Alternatively, the switchover means may be driven by a motor other than the first motor M1 and the second motor M2.

Figure 9:
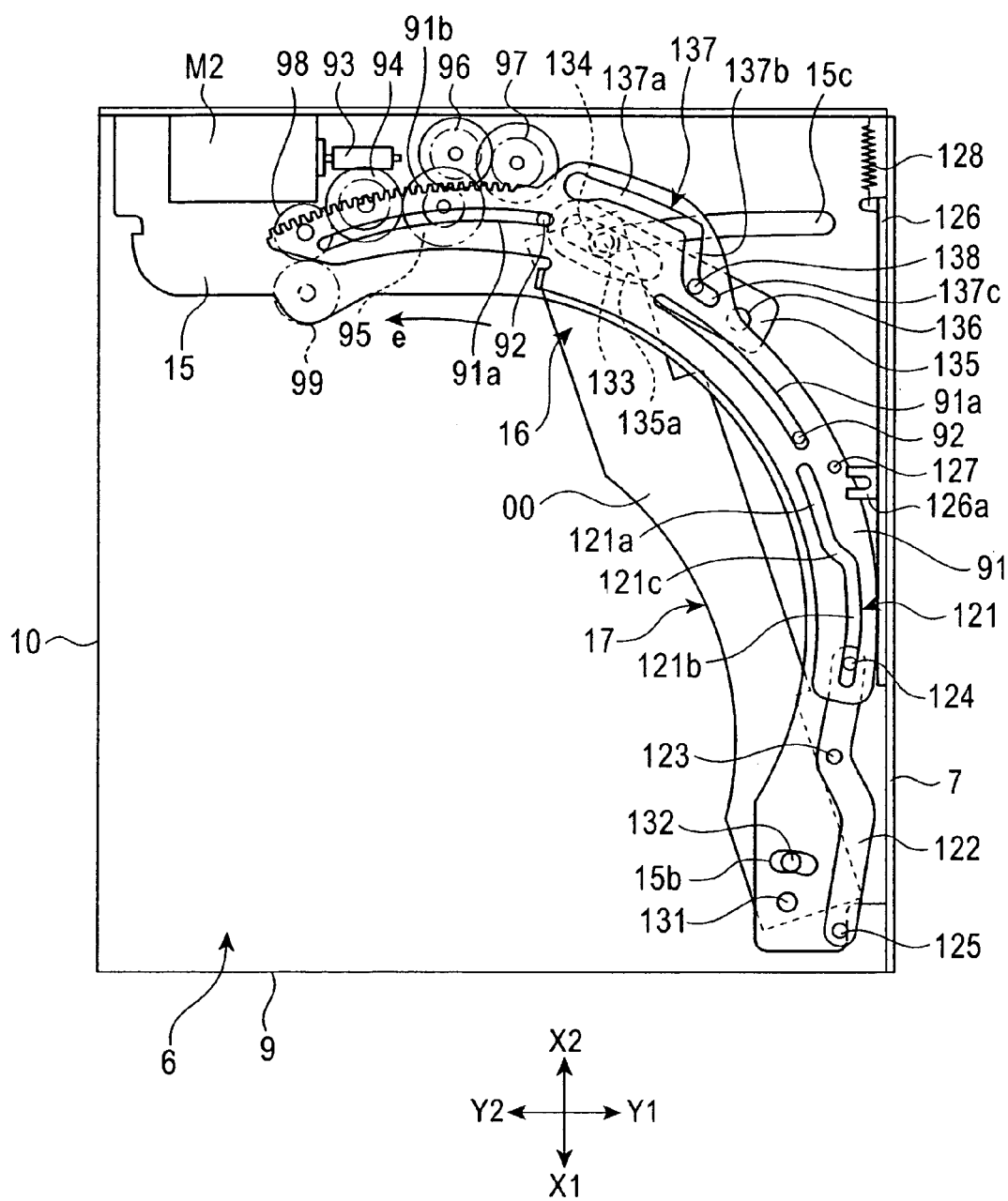
Figure 10:
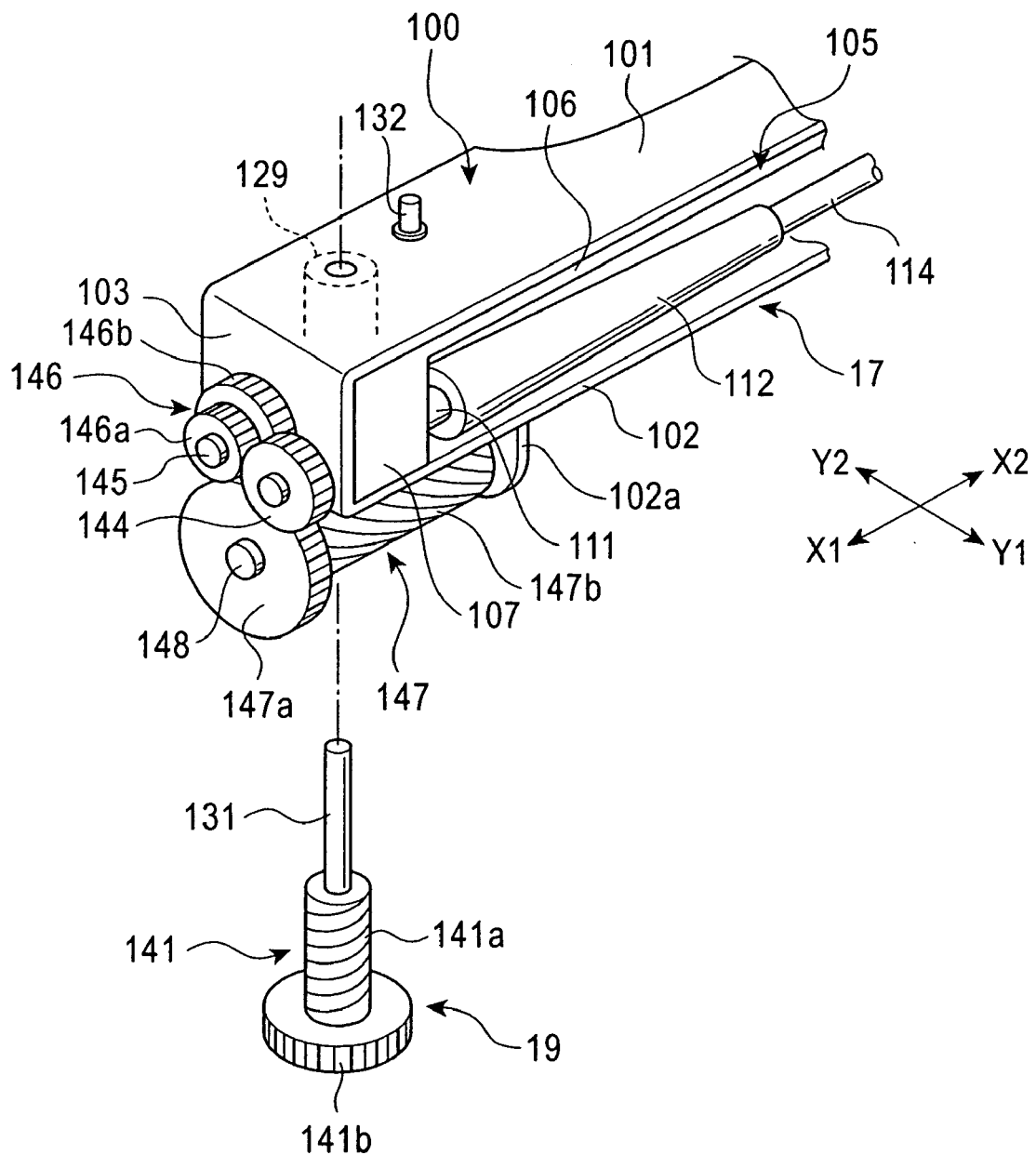
FIG. 10 is a disassembled perspective view illustrating one embodiment of a third motive force transmission mechanism.

As shown in FIGS. 1, 8, and 9, the transporting unit 17 is provided below the mechanism base 15. As shown in FIGS. 2A and 10, the transporting unit 17 has a metal unit frame 100 which is slender and extends in the X1-X2 direction. The unit frame 100 has an upper face 101, lower face 102, fulcrum-side side face 103, and free-side side face 104, with the inside of the unit frame 100 being open in the Y1-Y2 direction. A sliding member 105 formed of a synthetic resin having a low friction coefficient is provided within the unit frame 100. The sliding member has a nipping portion 106 extending along the upper face 101 of the unit frame 100, a side guide portion 107 positioned on the inner side of the fulcrum-side side face 103, and a side guide portion 108 positioned on the inner side of the free-side side face 104. The gap between the side guide portion 107 and the side guide portion 108 facing one another is wider than the diameter of the disk D, and is approximately the same as the opening width dimensions W of the insertion opening 23 or slightly greater, as shown in FIG. 2A.

As shown in FIGS. 10 through 13, the transporting unit 17 has a roller shaft 111 provided within the unit frame 100. The roller shaft 111 extends in parallel with the upper face 101 of the unit 100, and is rotatably supported by the fulcrum-side side face 103 and the free-side side face 104 at the both ends thereof. As shown in FIGS. 11 through 13, provided on the perimeter of the roller shaft 111 are a first transporting roller 112 and a second transporting roller 113, both formed of a material with a high friction coefficient, such as synthetic rubber or natural rubber or the like. The first transporting roller 112 and second transporting roller 113 are provided with spacing therebetween in the axial direction. In the event that the transporting unit 17 is in the standby position shown in FIGS. 12 and 13, the first transporting roller 112 and second transporting roller 113 are approximately parallel to the front face 7 of the casing 2 and at positions equally distanced from the insertion center line Oa.

A middle portion 114 situated between the first transporting roller 112 and second transporting roller 113 provides no substantial transporting force to the disk D. The middle portion 114 is formed so as to be integral with the transporting rollers 112 and 113 and smaller that the transporting rollers 112 and 113, or is formed as a portion where the roller shaft 111 is directly exposed.

As shown in FIGS. 2A and 10, the first transporting roller 112 and second transporting roller 113 face the nipping portion 106 of the sliding member 105. At least one of the transporting roller 112 and 113 and the nipping portion 106 is pressed by a spring, such that the transporting rollers 112 and 113 and the nipping portion 106 are elastically pressed against each other. Accordingly, the disk D can be nipped between the transporting roller 112 and the nipping portion 106, and the transporting roller 113 and the nipping portion 106. In the pressed state, the space between the middle portion 114 and the nipping portion 106 is greater than the thickness dimension of the disk D, so that the disk D is not nipped between the middle portion 114 and the nipping portion 106.

The first transporting roller 112 and second transporting roller 113 are rotatably passed over the perimeter of the roller shaft 111 without adhesion to the perimeter of the roller shaft 111. When the nipping pressure as to the disk D is acting upon the transporting rollers 112 and 113, the friction between the transporting rollers 112 and 113 and the roller shaft 111 increases, such that the roller shaft 111 and the transporting rollers 112 and 113 rotate integrally. The arrangement is such that if the disk D being nipped is grasped by human fingers, or in like cases wherein a large resistance force is applied to the disk D being transported, the roller shaft 111 slips with regard to the transporting rollers 112 and 113.

In one embodiment, the nipping portion 106 is formed of a synthetic resin material having a low friction coefficient, but an arrangement may be made wherein the nipping portion is a free-rotating roller.

The transporting unit 17 is arranged to turn from the standby position shown in FIGS. 8, 12, and 13, to the transporting operation position shown in FIGS. 9 and 11, with the end at the X1 end in the drawing as a fulcrum. At the standby position, the unit frame 100 is slightly removed from the perimeter of the disk D supported by the supporting medium 21 in the disk storing region 20. As shown in FIG. 11, upon the transporting unit 17 turning in the counter-clockwise direction and reaching the transporting operation position, a transporting center line Ob which is an imaginary line passing through the center point between the transporting rollers 112 and 113 and extending perpendicularly to the axial line of the transporting rollers 112 and 113 passes through the disk storing region 20 having multiple supporting members 21.

As shown in FIGS. 1, 2A, and 10, a pivot 131 serving as the turning fulcrum of the transporting unit 17 is fixed on the base face 6 of the lower casing 3 so as to extend upwards. As shown in FIG. 10, the transporting unit 17 is provided with a bearing portion 129 extending in a direction orthogonal to the roller shaft 111 at the end thereof in the X1 direction. The bearing portion 129 is rotatably supported by the pivot 131. As shown in FIG. 11 and other drawings, the pivot 131 and bearing portion 129 are disposed at a position away from the perimeter of the disk D transported by the transporting unit 17.

With the second motive force transmission mechanism 16 shown in FIGS. 8 and 9, an arc-shaped guide hole 15b is opened in the X1 side of the mechanism base 15 of the middle casing 4, and another arc-shaped guide hole 15c is opened in the X2 side as well. The guide hole 15b and the guide hole 15c both follow arc courses centered on the pivot 131.

On the upper face 101 of the unit frame 100 of the transporting unit 17, a guide shaft 132 extending perpendicularly upwards is fixed at a position near to the pivot 131, and the free end side thereof away from the pivot 131 has a driving shaft 133 extending perpendicularly upwards in the same way. As shown in FIGS. 8 and 9, the guide shaft 132 is passed through the guide hole 15b from the bottom upwards, and the driving shaft 133 is also passed through the guide hole 15c from the bottom upwards. The tip of the driving shaft 133 protrudes upwards from the mechanism base 15, and a turning ring 134 is turnably provided on the driving shaft 133.

A driving lever 135 is provided on the mechanism base 15. The base of the driving lever 135 is turnably supported on the mechanism base 15 via a shaft 136. The driving lever 135 has opened therein a driving slot 135a, and the turning ring 134 provided on the perimeter of the driving shaft 133 is inserted inside the driving slot 135a.

The switchover member 91 provided on the mechanism base 15 has opened therein a unit control slot 137. A transmission shaft 138 protrudes perpendicularly on the upper face of the driving lever 135 and is inserted into the unit control slot 137 from the bottom upwards.

A non-acting portion 137a is formed in the unit control slot 137. The non-acting portion 137a is formed following an arc course, the center of curvature of which is the center of curvature of the arc course of the switchover member 91 sliding in the (d)-(e) directions. As shown in FIG. 8, when the transmission shaft 138 is positioned within the non-acting portion 137a, even when the switchover member 91 slides in the (d)-(e) direction, the moving force thereof does not act upon the transmission shaft 138. Additionally, the center of curvature of the non-acting portion 137a and the shaft 136, which is the center of rotation of the driving level 135, are not at the same position. When the transmission shaft 138 is positioned within the non-acting portion 137a and the switchover member 91 slides in the (d)-(e) direction, the driving lever 135 is held in a state turned in the clockwise direction, and the transporting unit 17 is maintained in the state stopped at the standby position.

With the unit control slot 137, a driving inclined portion 137b is provided continuing from the Y1 side of the non-acting portion 137a. Additionally, a holding portion 137c is formed at the end on the Y1 side. The holding portion 137c is positioned further toward the center of curvature of the sliding course of the switchover member 91 than the non-acting portion 137a.

While the switchover member 91 slides toward the (e) direction from the position shown in FIG. 8 to reach the position shown in FIG. 9, the transmission shaft 138 makes transmission to the driving inclined portion 137b, the transmission shaft 138 is moved in the counter-clockwise direction by the driving inclined portion 137b, and the driving lever 135 is turned in the counter-clockwise direction. Consequently, the transporting unit 17 turns in the counter-clockwise direction with the pivot 131 as its fulcrum, and reaches the transporting operation position. Upon the switchover member 91 moving further in the (e) direction, the driving shaft 133 is situated at the Y2 end potion of the guide hole 15c, and the transmission shaft 138 is held at the holding portion 137c of the unit control slot 137, so that the transporting unit 17 is restricted at the transporting operation position.

With this embodiment, the unit control slot 137 provided in the switchover member 91 and the driving lever 135 make up transporting unit turning means.

As shown in FIGS. 8 and 9, a switchover slot 121 is formed at the Y1 side and X1 side end of the switchover member 91. This switchover slot 121 has a first arc portion 121a, a second arc portion 121b extending in the (d) direction, situated further outside from the first arc portion 121a, and a switchover portion 121c connecting the arc portions 121a and 121b. The center of curvature of the first arc portion 121a and the second arc portion 121b matches the center of curvature of the arc courses of the guide slots 91a.

A switchover lever 122 is provided at the Y1 side of the mechanism base 15 at the edge thereof. The switchover lever 122 is positioned between the mechanism base 15 and switchover member 91, and is turnably supported by a supporting shaft 123 fixed on the upper face of the mechanism base 15. A control pin 124 is fixed at the end of the switchover lever 122 on the X2 side, and the control pin 124 is slidably inserted into the switchover slot 121 formed on the switchover member 91. A switchover pin 125 is fixed on the X1 side end of the switchover lever 122. As described below, the attitude of the holding member 26 provided to each supporting member 21 can be controlled by this switchover pin 125.

As shown in FIGS. 8 and 9, a shutter opening/closing member 126 is provided on the inner side of the front face 7 of the casing 2. The shutter opening/closing member 126 is formed of a metal plate, and is supported on the inner side of the front face 7 so as to be slidable in the X1-X2 direction. Also, the shutter opening/closing member 126 is pulled in the X2 direction by a pulling coil spring 128. Provided to the shutter opening/closing member 126 is a driving piece 126a bent from the lower edge in the Y2 direction. A driving pin 127 is fixed on the switchover member 91, and as shown in FIG. 8, this driving pin 127 can be inserted to a groove formed on the driving piece 126a.

In FIG. 8, the transmission shaft 138 provided on the driving lever 135 is positioned within the non-acting portion 137a of the unit control slot 137 formed on the switchover member 91, and the transporting unit 17 has turned in the clockwise direction and is at the standby position. At this time, the control pin 124 provided to the switchover lever 122 is positioned within the first arc portion 121a of the switchover slot 121, and the switchover lever 122 has turned in the counter-clockwise direction with the switchover pin 125 having moved to the Y1 side. At this time, the driving pin 127 provided to the switchover member 91 is in the groove of the driving piece 126a, and the shutter opening/closing member 126 has moved in the X1 direction.

When the switchover member 91 moves from the position shown in FIG. 8 in the (e) direction, prior to the transmission shaft 138 entering the driving inclined portion 137b of the unit control slot 137, the control pin 124 provided on the switchover lever 122 enters the second arc portion 121b of the switchover slot 121, the switchover lever 122 turns in the clockwise direction, and the switchover pin 125 moves in the Y2 direction. Due to the subsequent movement of the switchover member 91 in the (e) direction, the transmission shaft 138 enters the driving inclined portion 137b of the unit control slot 137, and as shown in FIG. 9, the transporting unit 17 turns in the counter-clockwise direction and reaches the transporting operation position. Also, while the switchover member 91 moves in the (e) direction from the position shown in FIG. 8 to the position shown in FIG. 9, the shutter opening/closing member 126 is moved in the X2 direction by the driving pin 127 provided on the switchover member 91.

Shutter Opening/Closing Mechanism

Figure 15A:
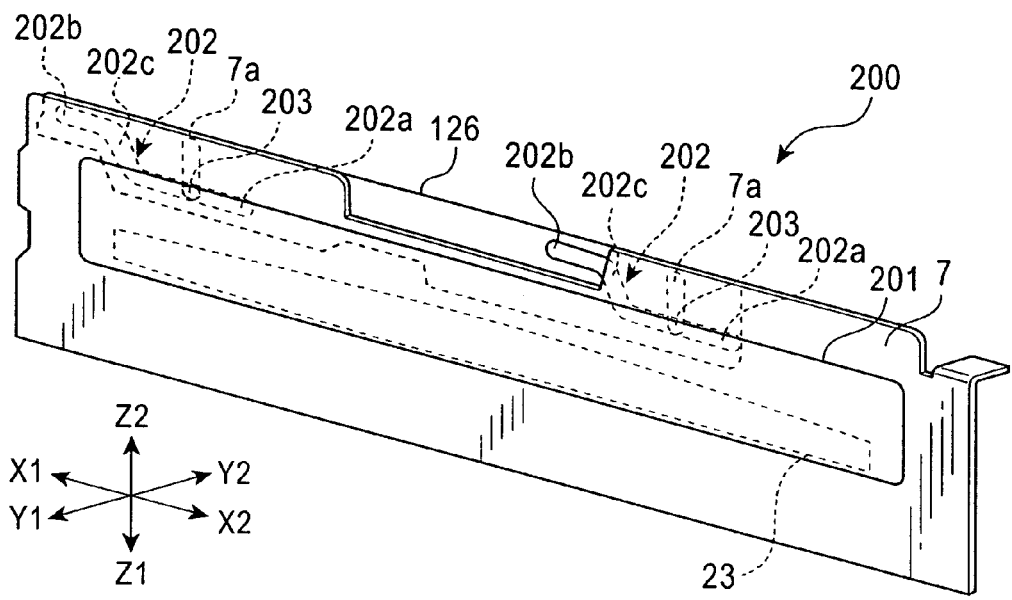
FIGS. 15A and 15B are partial perspective view illustrating the opening/closing action of a shutter provided on the front face of the casing.
Figure 15B:
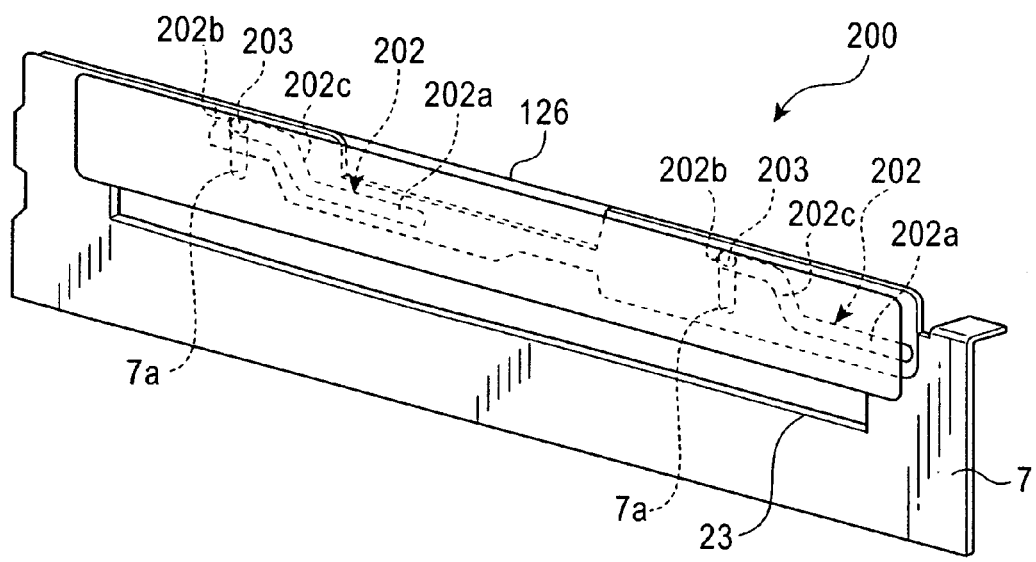

FIGS. 15A and 15B are perspective views illustrating one embodiment of a shutter opening/closing mechanism 200 from the front side of the front face 7 of the casing 2. The shutter 201 is formed of a thin metal plate, having a rectangular shape that is slender in the X1-X2 direction, and includes enough area to cover the insertion opening 23 formed on the front face 7 of the casing 2. Sliding pins 203 are fixed on the upper end of the shutter 201 on the Z2 side with spacing therebetween in the X1-X2 direction. Sliding slots 7a are formed on the front face 7 of the casing 2 so as to extend linearly in the vertical direction. The sliding pins 203 are inserted into the sliding slots 7a, such that the shutter 201 is supported to be vertically movable while being in contact with the surface of the front face 7.

Opening/closing cams 202 are formed on the shutter opening/closing member 126. These opening/closing cams 202 are cam grooves penetrating the shutter opening/closing member 126. The shutter opening/closing member 126 has a closing portion 202a extending linearly in the X2 direction, an opening portion 202b extending linearly in the X1 direction higher than the closed portion 202a, and a inclined switchover portion 202c connecting the closing portion 202a and the opening portion 202b.

As shown in FIG. 8, when the switchover member 91 of the second motive force transmission mechanism 16 is positioned in the (d) direction, the driving pin 127 moves the shutter opening/closing member 126 to the X1 side. At this time, as shown in FIG. 15A, the sliding pins 203 are pressed down by the closing portions 202a of the opening/closing cams 202, formed on the shutter opening/closing member 126, so that the shutter 201 descends and the insertion opening 23 is closed. As shown in FIG. 9, upon the switchover member 91 moving in the (e) direction, the driving pin 127 and the pulling coil spring 128 move the shutter opening/closing member 126 in the X2 direction and the sliding pins 203 are pressed upwards by the opening portions 202b of the opening/closing cams 202 as shown in FIG. 15B, so that the shutter 201 ascends and the insertion opening 23 is opened.

With respect to the opening/closing timing of the shutter 201, as shown in FIG. 8, the shutter 201 is closed when the transmission shaft 138 is positioned within the non-acting portion 137a of the unit control slot 137 and the turning unit 17 is stopped at the standby position. Upon the switchover member 91 moving in the (e) direction from the state shown in FIG. 8 and the transmission shaft 138 reaching the end of the non-acting portion 137a of the unit control slot 137 at the (d) side, the shutter 201 is opened. Further, upon the switchover member 91 moving in the (e) direction, the transmission shaft 138 enters the driving inclined portion 137b of the unit control slot 137, and the transporting unit 17 turns toward the transporting operation position as shown in FIG. 9. During this time, the shutter 201 remains open.

When the switchover member 91 moves from the position shown in FIG. 9 in the (d) direction, the transporting unit 17 turns in the clockwise direction so as to be restored to the standby position. The transmission shaft 138 then enters the non-acting portion 137a from the driving inclined portion 137b and the shutter 201 is closed.

Third Motive Force Transmission Mechanism

The structure of the third motive force transmission mechanism 19 provided on the base face 6 of the lower casing 3 is described below. As shown in FIG. 6 and FIG. 10, an integral gear 141 is rotatably supported at the bottom of the pivot 131 fixed to the base face 6. This integral gear 141 has the upper portion thereof formed of a vertical worm gear 141a, and the lower portion formed as a lower gear 141b. As shown in FIG. 6, an intermediate gear 142 is rotatably provided on the base face 6 of the casing 2, with the intermediate gear 142 meshing with the lower gear 141b. A third motor M3 is provided on the base face 6, and a worm gear 143 fixed to the rotation shaft meshes with the intermediate gear 142.

As shown in FIG. 10, with the transporting unit 17, one end of the roller shaft 111 protrudes outwards from the fulcrum-side side face 103 of the unit frame 100. A roller gear 144, which is a spur gear, is fixed to the end of the roller shaft 111 protruding from the side face 103. A shaft 145 is fixed to the side face 103, and an integral gear 146 is rotatably supported by the shaft 145. The integral gear 146 is integrally formed of a small-diameter spur gear 146a and a large-diameter spur gear 146b, with the small-diameter spur gear 146a meshing with the roller gear 144.

A supporting piece 102a protruding downwards is formed integrally on the lower face 102 of the unit frame 100. A shaft 148 is fixed to the supporting piece 102a. The shaft 148 extends in parallel with the roller shaft 111. An integral gear 147 is rotatably supported by the shaft 148. The integral gear 147 is integrally formed of a spur gear 147a and a worm wheel 147b. The spur gear 147a meshes with the large-diameter spur gear 146b.

When the bearing portion 129 provided to the transporting unit 17 is rotatably passed on the pivot 131, the worm wheel 147b and the worm gear 141a mesh. The rotational motive force of the third motor M3 is transmitted from the intermediate gear 142 to the lower gear 141b and the worm gear 141a, and from the worm gear 141a to the worm wheel 147b. The motive force is transmitted from the spur gear 147a to the large-diameter spur gear 146b, and from the small-diameter spur gear 146a to the roller gear 144.

The rotational motive force of the third motor M3 provided on the lower casing 3 side is transmitted to the roller gear 144, via the integral gear 141 concentrically rotating with the pivot 131, so that the roller shaft 111 can be driven independently from the action of turning the transporting unit 17 from the standby position to the transporting operation position, with the pivot 131 serving as a fulcrum. The disk-storing disk device 1 has separate transporting unit turning means for turning the transporting unit 17 from the standby position to the transporting operation position, and roller driving means for driving the transporting rollers 112 and 113. Due to the separate transporting unit turning means and roller driving means, each can be operated independently.

Disk Storing Region and Supporting Member Selecting Mechanism

The following is a description regarding the structure of the disk storing region 20 provided in the upper casing 5, and the supporting member selecting mechanism 22. FIGS. 11 through 13 are a plan view of the disk storing region from above the ceiling face 11 of the casing 2. FIGS. 16 through 20 illustrate the upper casing 5 inverted 180° on a center line extending in the Y1-Y2 direction. Accordingly, with FIGS. 16 through 20, the Y1-Y2 direction is the same as with FIGS. 11 through 13, but the X1-X2 direction and Z1-Z2 direction are opposite to FIGS. 11 through 13.

Figure 16:
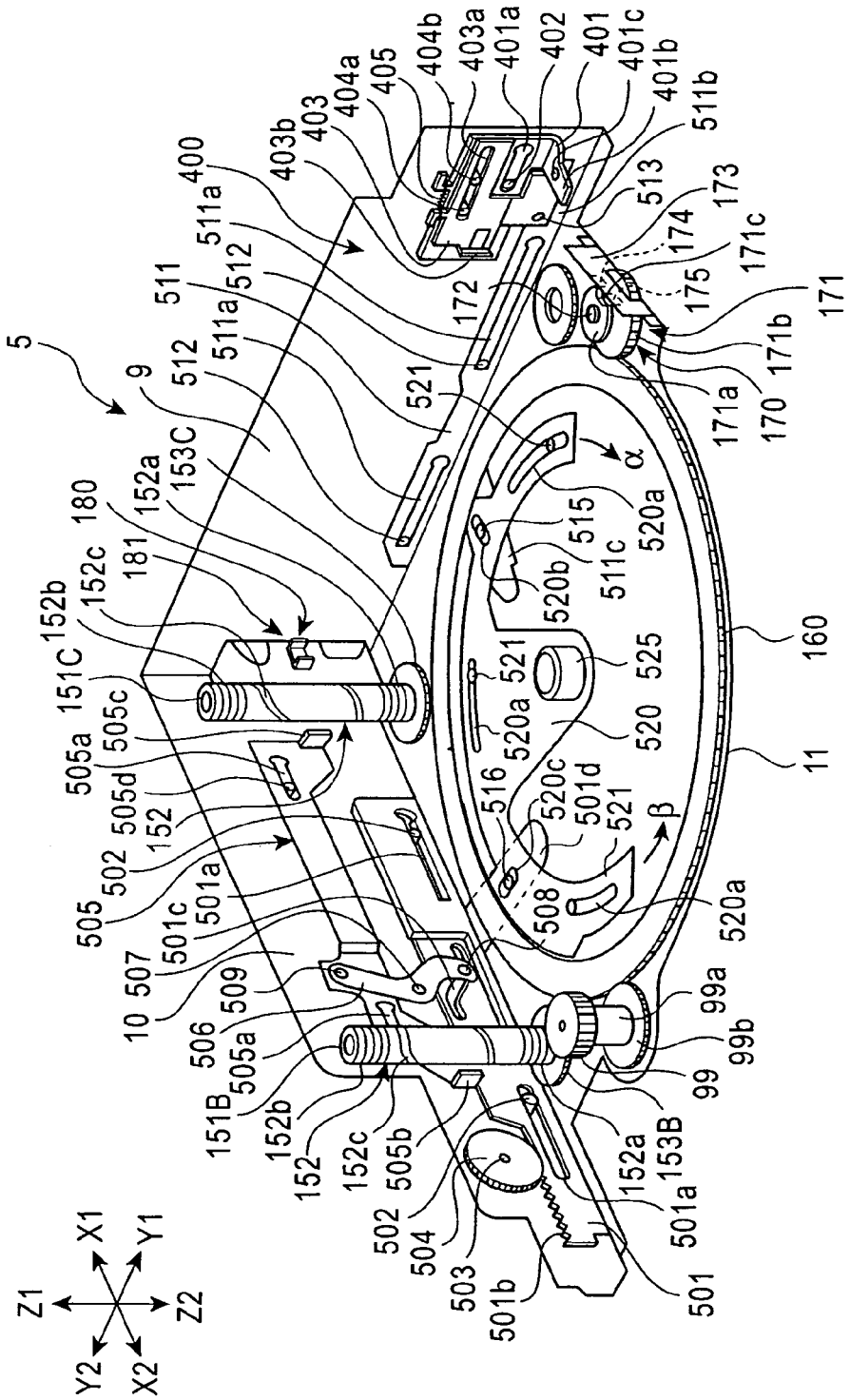
FIGS. 16 and 17 are perspective views illustrating one embodiment of a disk storage region and holding switchover mechanism.
Figure 17:
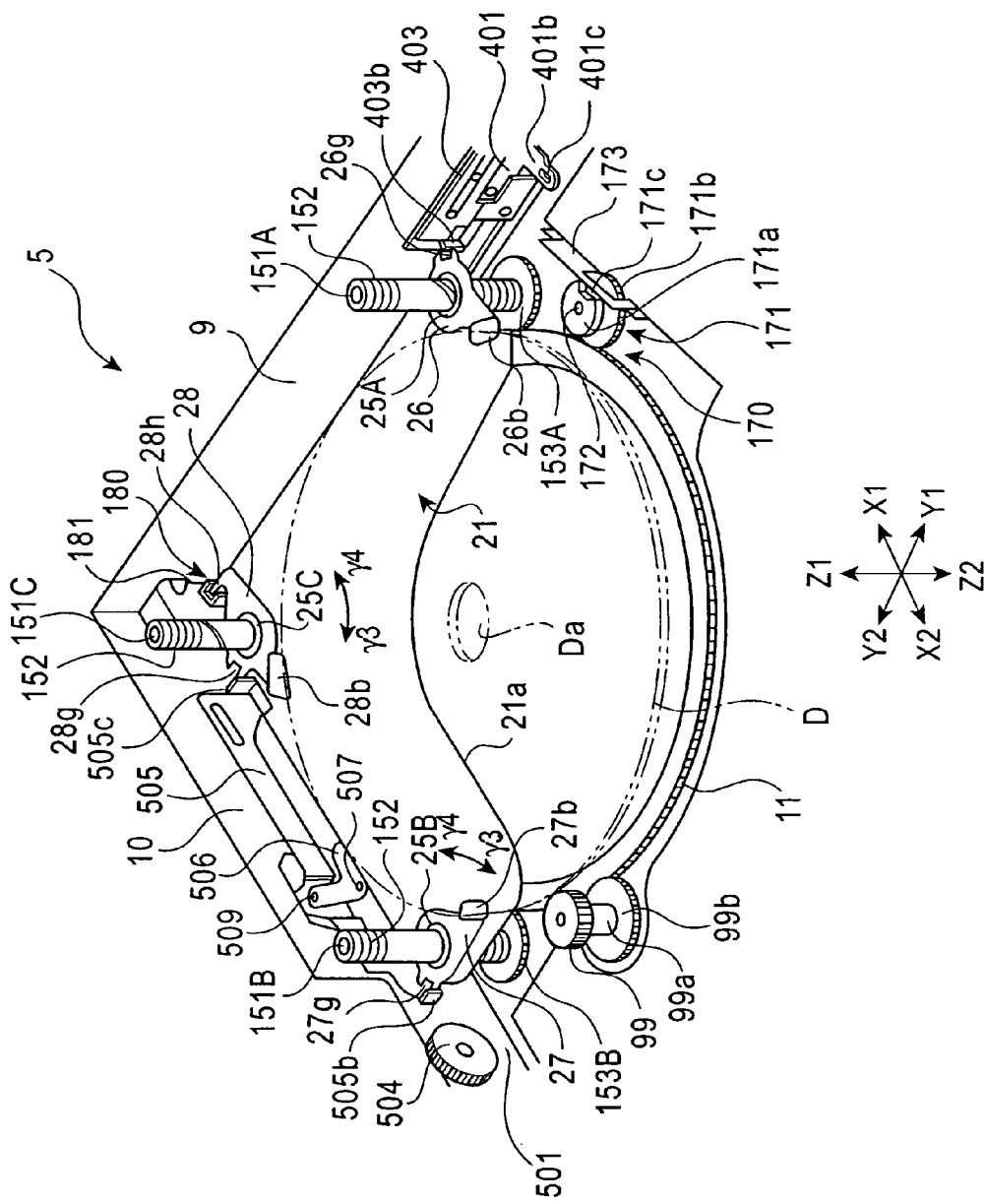

As shown in FIGS. 1 and 2B, three selecting shafts 151A, 151B, and 151C, mutually parallel and extending downwards, are rotatably supported by the ceiling face 11 of the upper casing 5. FIG. 17 shows the three selecting shafts 151A, 151B, and 151C, but in FIG. 16, the selecting shaft 151A is omitted from the illustration with only 151B and 151C illustrated.

A selecting groove 152 is formed on the perimeter of each of the selecting shafts 151A, 151B, and 151C. The selection groove 152 is formed as a spiral. As shown in FIGS. 2B and 16, the spiral form of the selection groove 152 includes a fine-pitched portion 152a at the upper part of the selecting shafts 151A, 151B, and 151C, and a fine-pitched portion 152b at the lower part thereof. At the upper fine-pitched portion 152a and the lower fine-pitched portion 152b, the selection groove 152 is formed at a short pitch, with the selection groove 152 at the upper fine-pitched portion 152a and the lower fine-pitched portion 152b each being formed with at least five turns (five threads). The intermediate portions of the selecting shafts 151A, 151B, and 151C have selection grooves 152 formed as coarse-pitch portions 152c. Each selection groove 152 makes one turn between the upper fine-pitched portion 152a and the lower fine-pitched portion 152b.

Six supporting members 21 are stacked vertically. Each supporting member 21 is formed of a thin metal plate. As shown in FIGS. 11 through 13, each supporting member 21 has a left side edge 21b approximately parallel to the left side face 9 of the casing 2, and a back edge 21c approximately parallel to the back edge face 10 of the casing 2. An inner edge 21a of the supporting members 21 has a convex curved shape facing the inner side of the casing such that when the driving unit 14 is positioned facing the intervention position, the inner edge 21a of the supporting member 21 is at a position away from the perimeter of the turntable 82.

As shown in FIGS. 11 and 17, each supporting member 21 has a bearing 25A fixed at a position which is the X1 side end and also the Y1 side end. Each supporting member 21 additionally has a bearing 25B fixed at a position which is the X2 side end and also the Y2 side end thereof, and a bearing 25C fixed at a position which is the inner side of the corner between the left side edge 21b and the back edge 21c. Bearing 25A is passed over the perimeter of the selection shaft 151A, bearing 25B is passed over the perimeter of the selection shaft 151B, and bearing 25C is passed over the perimeter of the selection shaft 151C. Engaging portions are formed integrally on the inner side of the bearings 25A, 25B, and 25C, in a protruding manner, with the engaging portions being slidably engaged in the selection grooves 152 formed on the perimeter of each of the selecting shafts 151A, 151B, and 151C.

The engaging portions of the six supporting members 21 are disposed engaged in each of the five adjacent turns of the selection groove 152. Accordingly, upon the selecting shafts 151A, 151B, and 151C being rotated counter-clockwise in FIG. 11, the supporting members 21 are fed downward along the selecting shafts 151A, 151B, and 151C. Upon the selecting shafts 151A, 151B, and 151C rotating clockwise, the supporting members 21 are fed upward along the selecting shafts 151A, 151B, and 151C. The one of the selecting members 21 engaged with the coarse pitch portion 152c releases the selection position (a) shown in FIG. 2B, and a vertical space is opened between the supporting member 21 at the selection position (a) and the supporting member 21 situated at the lower fine-pitched portion 152b such that the driving unit 14 can be inserted therebetween.

As shown in FIGS. 16 and 17, a pinion 153A is provided at the top (the Z2 side end) of the selection shaft 151A, a pinion 153B is provided at the top of selecting shaft 151B, and a pinion 153C is provided at the top of selecting shaft 151C. The selecting shafts 151A, 151B, and 151C, and the pinions 153A, 153B, and 153C, are respectively formed integrally of a synthetic resin material, with the pinions 153A, 153B, and 153C being formed thinly and in contact with the lower face of the ceiling face 11 of the upper casing 5.

As shown in FIG. 16, a large-diameter and thin ring gear 160 is rotatably provide on the lower face of the ceiling face 11 of the upper casing 5, with teeth formed on the outer side of the ring gear 160. The pinions 153A, 153B, and 153C, provided on the selecting shafts 151A, 151B, and 151C, mesh with the teeth of the ring gear 160. Rotation of the ring gear 160 synchronously rotates the pinions 153A, 153B, and 153C, which accordingly synchronously rotates the selecting shafts 151A, 151B, and 151C.

As shown in FIGS. 2B and 16, a rotational shaft 99a is rotatably supported on the lower face of the ceiling face 11 of the upper casing 5. The transmission gear 99 shown in FIGS. 8 and 9 is fixed on the lower end of the rotational shaft 99a, with the transmission gear 99 being capable of meshing with the second switchover gear 98 of the second motive force transmission mechanism 16 shown in FIG. 8. A thin gear 99b is fixed at the upper end of the rotational shaft 99a, with the thin gear 99b being engaged with the teeth on the perimeter of the ring gear 160. As shown in FIG. 8, in a state wherein the second switchover gear 98 of the second motive force transmission mechanism 16 is meshed with the output gear 94 and the transmission gear 99, and the first switchover gear 95 is disengaged from the output gear 94, starting the second motor M2 transmits motive force to the transmission gear 99 such that the thin gear 99b integrally formed with the transmission gear 99 drives the ring gear 99.

As shown in FIG. 8, when the second motive force transmission mechanism 16 is in a state that the transmission shaft 138 is positioned within the non-acting portion 137a of the unit control slot 137 formed on the switchover member 91, the driving lever 135 has turned in the clockwise direction, and the transporting unit 17 is stopped in the standby position, starting the second motor M2 drives the transmission gear 99 such that the ring gear 160 is driven, and a selection action of the supporting members 21 is performed.

As shown in FIGS. 16 and 17, a rotation detecting unit 170 is provided on the lower face of the ceiling face 11 of the upper casing 5. The rotation detecting unit 170 has a rotating member 171. A supporting shaft 172 is also fixed on the lower face of the ceiling face 11 of the upper casing 5, and the rotating member 171 is rotatably supported by the supporting shaft 172. The rotating member 171 has integrally formed thereupon a detecting portion 171a and a gear 171b, with the gear 171b meshing with the teeth on the perimeter of the ring gear 160.

Figure 20:
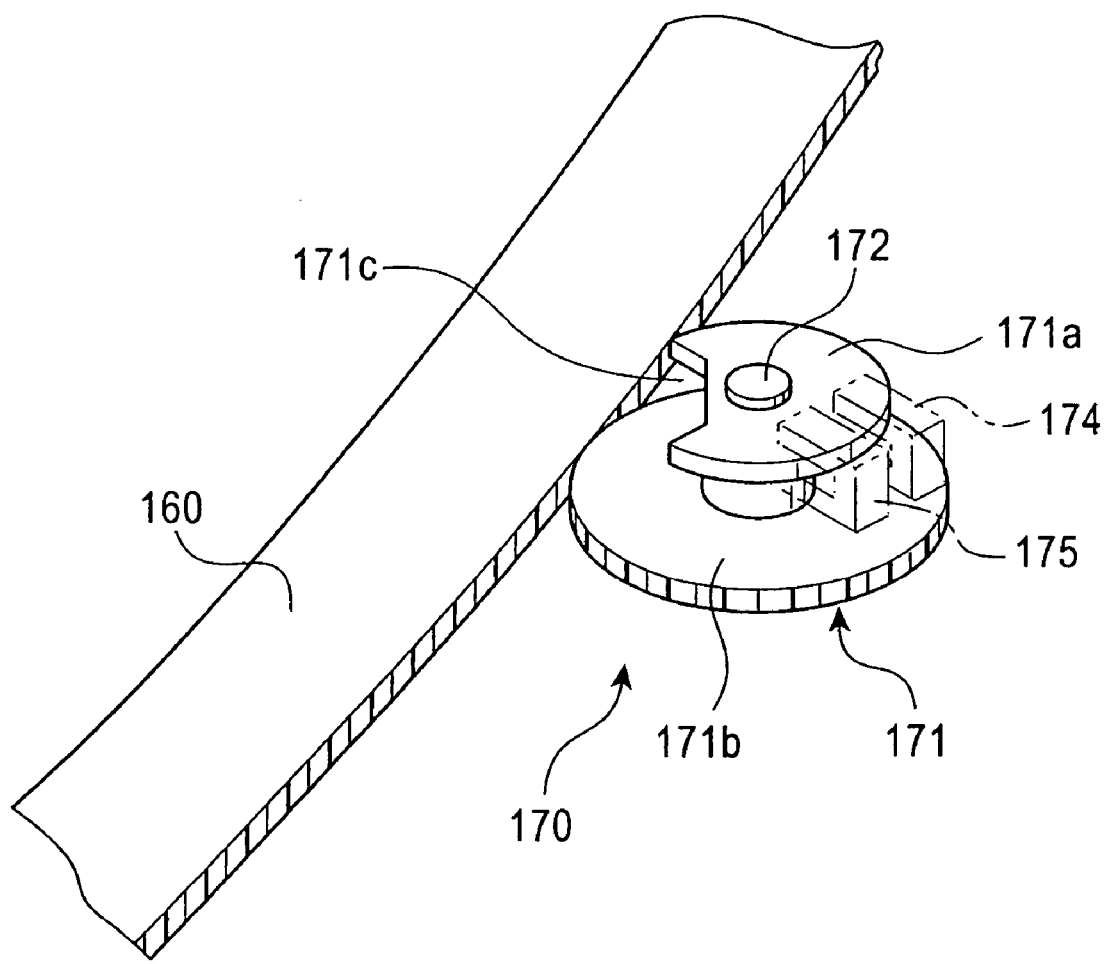
FIG. 20 is a partial enlarged perspective view illustrating a configuration of one embodiment of a rotation detecting unit provided to the supporting member selecting mechanism.

As shown in FIG. 20, a notched portion 171c is formed on the detecting portion 171a of the rotating member 171. As shown in FIGS. 16 and 17, a printed circuit board 173 is perpendicularly fixed on the lower face of the ceiling face 11, and a pair of photodetectors 174 and 175 are fixed on the printed circuit board 173. As shown in FIG. 20, the photodetectors 174 and 175 are arrayed in the direction of rotation of the detecting portion 171a, with each having a light-emitting element facing the upper face of the detecting portion 171a, and a photoreceptor facing the lower face of the detecting portion 171a.

Upon the notched portion 171c of the detecting portion 171a facing the photodetectors 174 and 175, photodetectors 174 and 175 receive light emitted from the light-emitting element, so that detection output is ON for both. When the detecting portion 171a shields the light emitted from the light-emitting element, the detection output is OFF. With the rotation detecting unit 170, upon the ring gear 160 rotating, the selecting shafts 151A, 151B, and 151C rotate, and when one of the supporting members 21 reach the selection position (a), detection output is ON for both the photodetectors 174 and 175. Upon the rotating member 171 making one further rotation and the detection output going ON for the photodetectors 174 and 175 again, the next supporting member 21 has reached the selection position (a). In the event that detection output is ON for both the photodetectors 174 and 175, and then one of the photodetectors 174 and 175 goes to OFF, the direction of rotation of the rotating member 171 can be determined depending upon which of the photodetectors 174 and 175 has gone to OFF first, thereby recognizing the rotation direction of the ring gear 160.

Monitoring the photodetectors 174 and 175 with the mechanism control unit enables the mechanism control unit to determine a direction which the selecting shafts 151A, 151B, and 151C are rotating, and whether the supporting members 21 are moving upwards or downwards. Also, stopping the second motor M2 of the second motive force transmission mechanism 16 at the point that both the photodetectors 174 and 175 are ON enables a supporting member 21 to be stopped at the selection position (a). Further, counting the number of times that both the photodetectors 174 and 175 go ON, enables recognition of which of the six supporting members 21 has reached the selection position (a).

In the embodiment described above, a supporting member selecting mechanisms for moving a selected supporting member 21 to the selection position (a) and spreading the gap with the supporting member 21 below the selected supporting member 21 is configured of three selecting shafts 151A, 151B, and 151C, each having selecting grooves 152; bearings 25A, 25B, and 25C, which each have engaging portions engaged with the selecting grooves 152; pinions 153A, 153B, and 153C which integrally rotate with the selecting shafts 151A, 151B, and 151C; a ring gear 160 which meshes with all of the pinions 153A, 153B, and 153C; and a transmission gear 99 which rotationally drives the ring gear 160.

The supporting member selecting mechanism is not restricted to the arrangement described above, and may be substituted with other mechanisms (e.g., a supporting member selecting mechanism using a separating lever and a pantograph mechanism described in Japanese Unexamined Patent Application Publication No. 10-216270.

Disk Holding Mechanism at Supporting Member

As shown in FIGS. 11 and 17, each of the supporting members 21 includes three holding members 26, 27, and 28. As shown in FIG. 17, the holding members 26, 27, and 28 are provided on the lower face (Z1 side face) of each supporting member 21. Note however, that in FIGS. 11 through 13 the holding members 26, 27, and 28 are illustrated by transparent view through the supporting member 21.

The holding member 26 is supported so as to turn on the perimeter of the bearing 25A through which the selection shaft 151A is inserted. The holding member 27 is supported so as to turn on the perimeter of the bearing 25B through which the selection shaft 151B is inserted, and the holding member 28 is supported so as to turn on the perimeter of the bearing 25C through which the selection shaft 151C is inserted.

As shown in FIG. 11, the holding member 26 and the supporting member 21 have spanned therebetween a pulling coil spring 29a, such that the holding member 26 is pulled in a turning fashion in the counter-clockwise direction. A stopper (not shown) is provided to the supporting member 21, and the holding member 26 is restricted so as to not turn in the counter-clockwise direction (γ2 direction) beyond the attitude shown in FIG. 11. The holding member 27 is pulled in the clockwise direction by a pulling coil spring 29b, and a stopper (not shown) provided to the supporting member 21 restricts the holding member 27 so as to not turn in the clockwise direction (γ4 direction) beyond the attitude shown in FIG. 11. In the same way, the holding member 28 is pulled in the clockwise direction by a pulling coil spring 29c, and a stopper (not shown) provided to the supporting member 21 restricts the holding member 28 so as to not turn in the clockwise direction (γ4 direction) beyond the attitude shown in FIG. 11.

As shown in FIG. 11, the selecting shaft 151A and the holding member 26 passed over the selecting shaft 151A are at the position of the casing 2 having the insertion opening 23 closest to the front face 7, and facing the left side face 9 of the casing 2. Also, the selecting shaft 151A and the holding member 26 are at the position closest to the transporting unit 17, and are situated at the turning pivot side of the transporting unit 17. The selecting shafts 151B and 151C and the holding members 27 and 28 passed over the selecting shafts 151B and 151C are at positions facing the back face 10 of the casing 2, and are situated away from the front face 7 having the insertion opening 23. A disk D inserted from the insertion opening 23 is transported into the casing 2 by the transporting rollers 112 and 113 of the transporting unit 17, and following the transporting unit 17 having reached the transporting operation position shown in FIG. 11, the disk D is further transported into the casing D by the transporting rollers 112 and 113. Accordingly, the disk D fed to a supporting member 21 at the selection position (a) initially comes close to the holding member 26 positioned at the perimeter of the selecting shaft 151A. Disc D is further transported into the casing 2 and comes into contact with the holding member 27 situated at the perimeter of the selecting shaft 151B, and the holding member 28 situated at the perimeter of the selecting shaft 151C.

Figure 18:
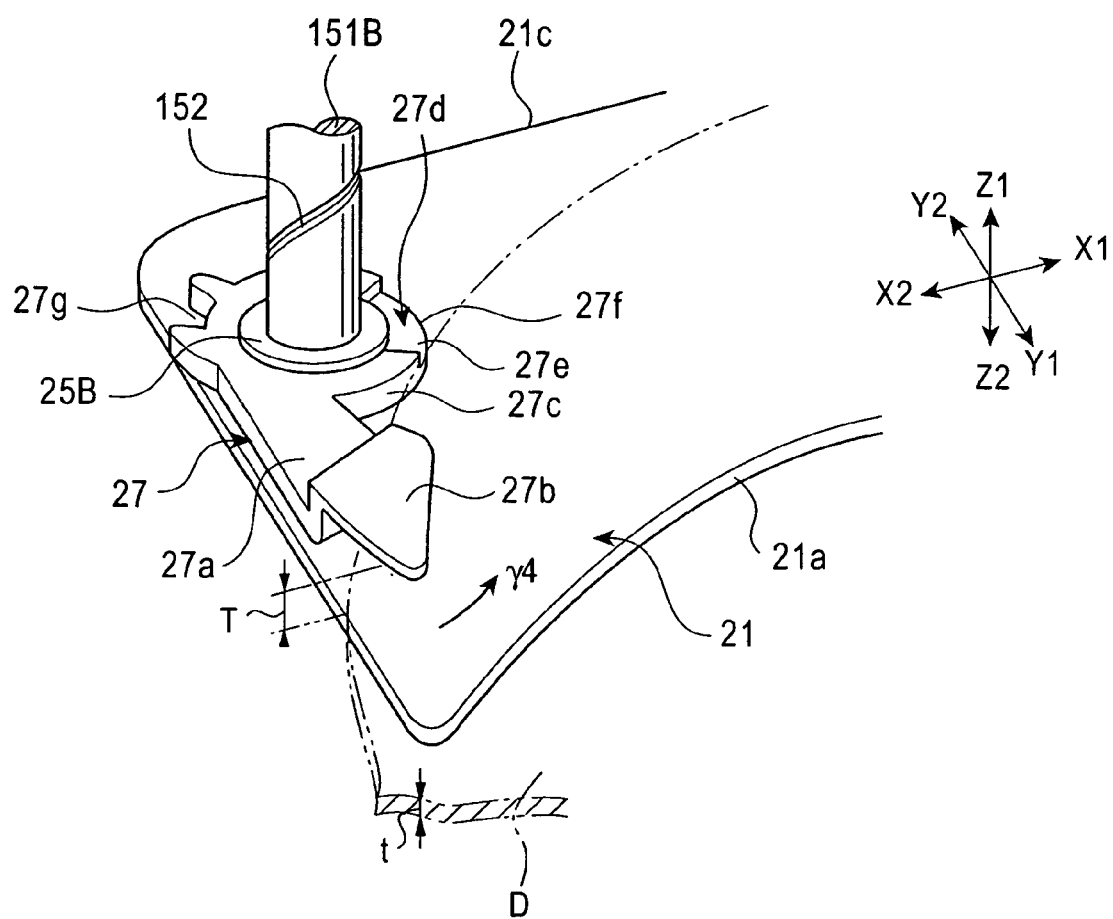
FIG. 18 is a partial enlarged perspective view illustrating a state wherein a disk is held on the lower face (upper face in the drawing) of a supporting member.
Figure 19:
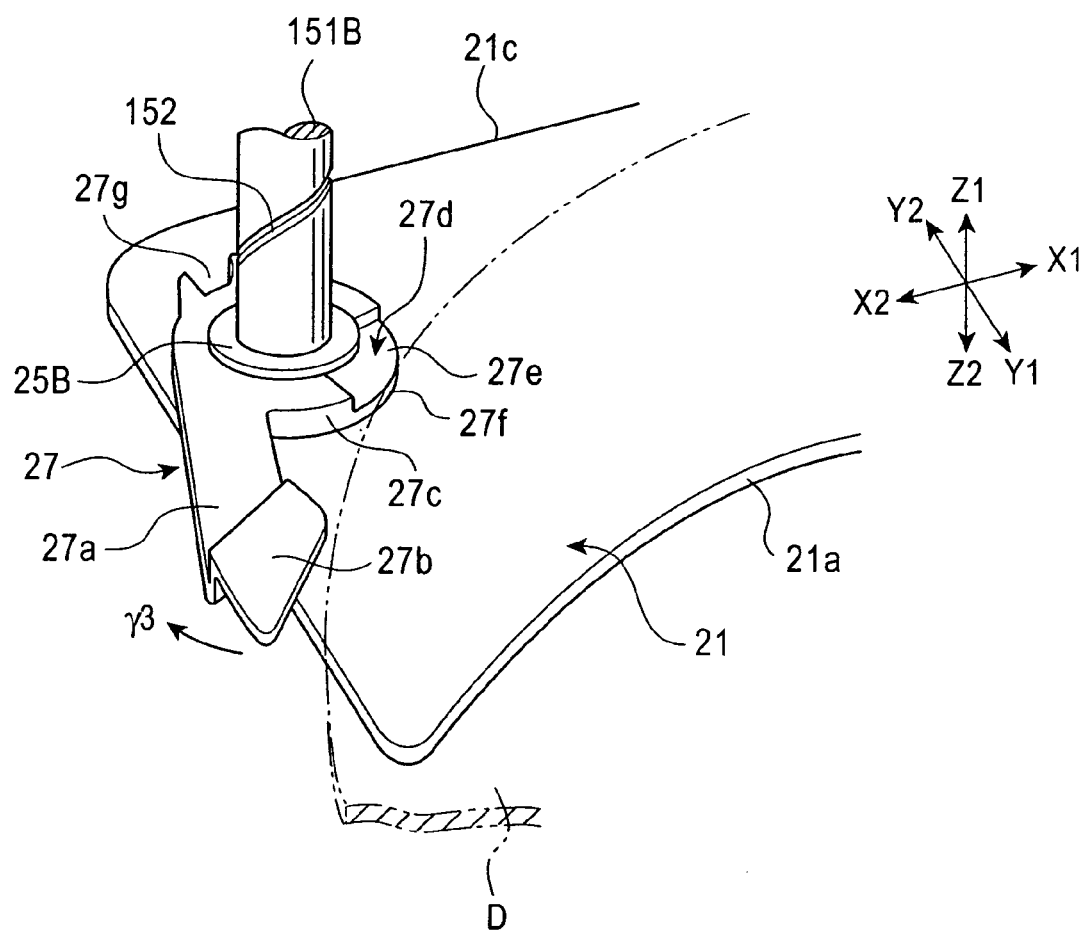
FIG. 19 is a partial enlarged perspective view illustrating a state wherein holding of a disk at the lower face (upper face in the drawing) of a supporting member is disengaged.

FIGS. 18 and 19 illustrate the holding member 27 positioned on the inner side of the back face 10 and at the X2 side, with the Z1 side facing upwards in the drawing.

The holding member 27 is formed of a synthetic resin material, and the holding member 27 is supported so as to be capable of turning on the perimeter of the bearing 25B fixed to the supporting member 21, in a state almost in close contact with the lower face of the supporting member 21. An arm 27a extending in the Y1 direction is integrally formed on the holding member 27, and a holding claw 27b is formed on the tip of the arm 27a. The holding claw 27b faces the lower face of the supporting member 21 with a spacing T therebetween. The spacing T may be the same as the thickness dimensions t of the disk D, or slightly greater.

Figure 14:
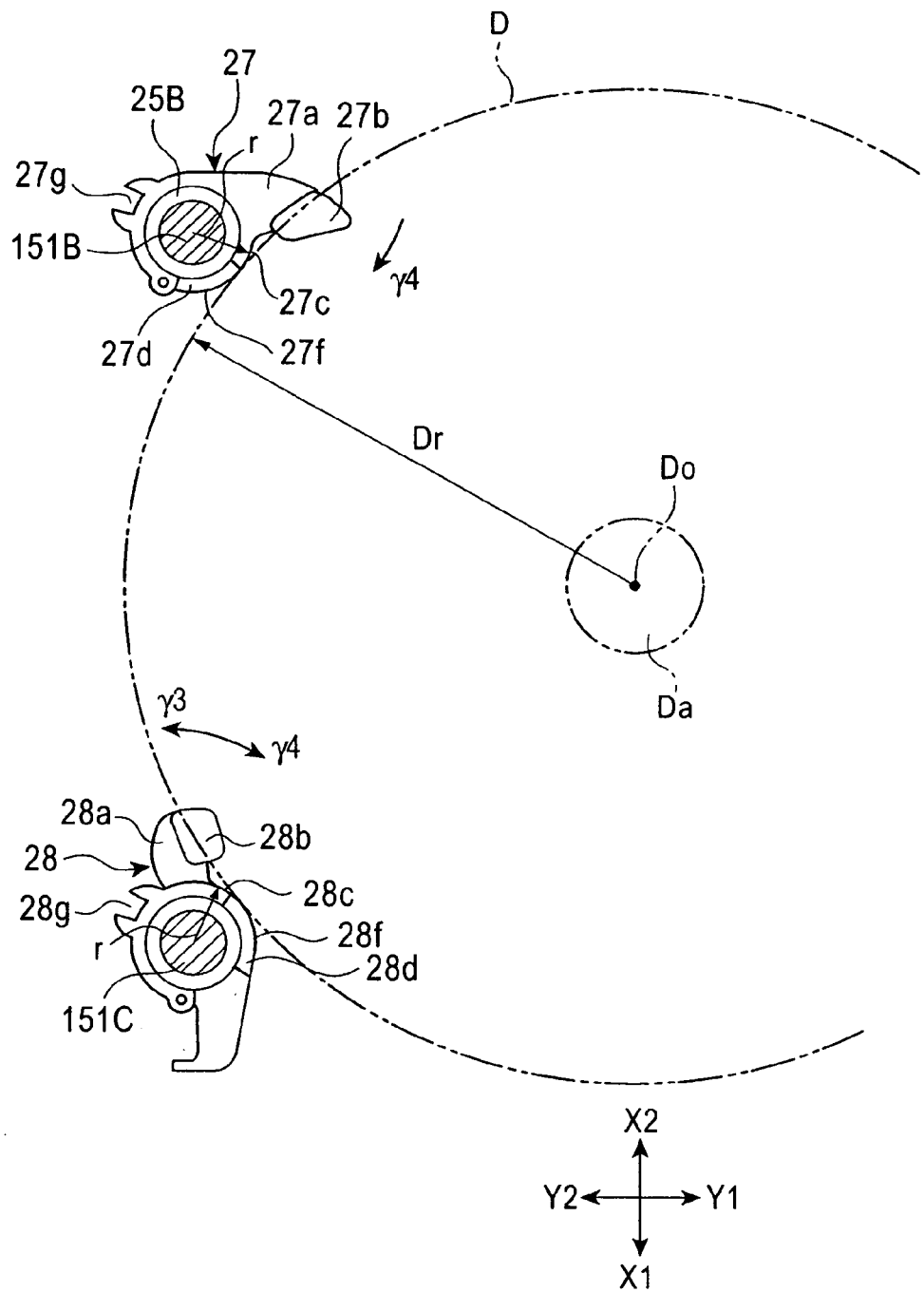
FIG. 14 is a partial enlarged plan view illustrating actions of positioning a disk.

The holding member 27 has a positioning face 27c formed which is disposed facing the inner side of the casing 2. The positioning face 27c has a vertical-direction (Z1-Z2 direction) thickness dimension such that the perimeter face of the disk D supplied between the lower face of the supporting member 21 and the holding claw 27b comes into contact therewith. As shown in FIG. 14, the positioning face 27c has a cylindrical face form with a radius of r from the axial center of the selecting shaft 151B. The holding member 27 has a clearance recess 27d formed on the γ4 side from the positioning face 27c. The base face 27e of the clearance recess 27d is a plane parallel with the lower face of the supporting member 21. The axial direction dimensions from the lower face of the supporting member 21 to the base face 27e is smaller than the vertical direction thickness dimensions of the positioning face 27c. Further, a perimeter face 27f of the holding member 27 where the clearance recess 27d is formed is a cylindrical face form with a radius of r. A driving recess 27g is formed at the approximately opposite side of the holding member 27 from the clearance recess 27d.

The structure of the other holding member 28 positioned at the back side face 10 side of the casing 2 is similar to that of the holding member 27. As shown in FIGS. 11 and 14, the holding member 28 has a holding claw 28b on the tip of an arm 28a, with the spacing T between the lower face of the supporting member 21 and the holding claw 28b being the same as the spacing between the holding claw 27b and the supporting member 21. The holding member 28 has a positioning face 28c formed facing within the casing 2, the positioning face 28c being a cylindrical face form with a radius of r from the axial center of the selecting shaft 151C. The holding member 28 has a clearance recess 28d formed on the γ4 side from the positioning face 28c. A perimeter face 28f of the holding member 28 where the clearance recess 28d is formed is also a cylindrical face form with a radius of r. Also, a driving recess 28g is formed at the opposite side from the clearance recess 28d.

As shown in FIG. 11, the holding member 26 positioned near to the front face 7 of the casing 2 has a holding claw 26b on the tip of an arm 26a, with the spacing between the lower face of the supporting member 21 and the holding claw 26b being T. The holding member 26 has a clearance recess 26d formed on the portion thereof facing within the casing 2. The base face of the clearance recess 26d is formed to the same height as the base faces of the clearance recesses 27d and 28d of the holding members 27 and 28. A driving recess 26g is formed on the holding member 26 at the opposite side from the clearance recess 26d.

As shown in FIGS. 11 and 14, when a disk D is transported into a supporting member 21 at the selection position (a), the holding member 27 and the holding member 28 are both turned in the γ4 direction by the pulling force of the pulling coil springs 29b and 29c. The disk D transported into the casing 2 by the transporting rollers 112 and 113 of the transporting unit 17 enters between the lower face of the supporting member 21 and the holding claw 27b, and between the lower face of the supporting member 21 and the holding claw 28b. The disk D is positioned upon the perimeter of the disk D coming into contact with the positioning face 27c formed on the holding member 27 and the positioning face 28c formed on the holding member 28. The center D0 of the disk D here is determined geometrically from the radius r of the positioning faces 27c and 28c, and the radius Dr of the disk D.

The positioning face 27c of the holding member 27 and the positioning face 28c of the holding member 28 are both a cylindrical face forms with a radius of r from the axial center of the selecting shafts 151B and 151C, so even in the event that there is error in the turning angle of the holding members 27 and 28, and the contact position between the perimeter of the disk D and the positioning faces 27c and 28c changes, the position of the center D0 of the disk D can be determined unambiguously as long as the radius Dr of the disk D is constant.

At the time of driving the disk D held by a supporting member 21, the center protrusion portion 82b of the turntable 82 provided to the driving unit 14 at the intervention position enters the center hole Da of the disk D, thereby clamping the disk D. At this time, as shown in FIG. 13, the holding member 27 and the holding member 28 are turned in the γ3 direction, so that the holding claw 27b and the holding claw 28c leave the perimeter of the disk D and move further outwards. Additionally, the holding member 26 turns in the γ1 direction with the holding claw 26b also leaving the perimeter of the disk D and moving further outwards. At this time, the clearance recess 27d of the holding member 27 faces the perimeter of the disk D as shown in FIG. 19. In the same way, the clearance recess 28d of the holding member 28 and the clearance recess 26d of the holding member 26 face the perimeter of the disk D.

Following the center hold Da of the disk D being clamped by the turntable 82, the driving unit 14 descends in the Z1 direction, and the disk D is slightly separated from the lower face of the supporting member 21. At this time, the positioning face 27c of the holding member 27 and the positioning face 28c of the holding member 28 are separated from the perimeter of the disk D, and the clearance recess 27d of the holding member 27 and the clearance recess 28d of the holding member 28 face the perimeter of the disk D. Further, the clearance recess 26d of the holding member 26 faces the perimeter of the disk D. When the disk D is rotationally driven, being held by the turntable 28, the unit supporting base 13 is elastically supported by the dampers 71, 72, and 73, so even in the event that the disk D comes close to the supporting member 21 and is displaced in the disk face direction within the vibration range of this elastic supporting, the perimeter of the disk D coming into contact with the positioning faces 27c and 28c can be avoided, since the clearance recesses 26d, 27d, and 28d face the perimeter of the disk D.

As shown in FIGS. 11 through 13, a loading detecting unit 180 for detecting that a disk D has been loaded to a supporting member 21 at the selecting position (a) is provided to the corner between the left side face 9 of the casing 2 and the back side face 10 thereof. The loading detecting unit 180 has a photodetector 181. The photodetector 181 is of a configuration wherein a light-emitting element and a photoreceptor are facing each other. As shown in FIGS. 16 and 17, only one such photodetector 181 is provided in the casing 2, and is provided at the same height as a supporting member 21 which has moved to the selecting position (a). As shown in FIGS. 11 through 13 and 17, each of the holding members 28 provided to the supporting members 21 are provided with a detecting portion 28h protruding on the tip of an arm extending in the opposite direction from the arm 28a.

As shown in FIG. 17, upon a supporting member 21 moving to the selecting position (a), the detecting portion 28h faces the photodetector 181. At this time, as shown in FIG. 11, when a disk D is not held by the supporting member 21 which has moved to the selecting position (a), the detecting portion 28h interferes between the light-emitting device and the photoreceptor of the photodetector 181 so that the detection output is OFF since the holding member 28 is turned widely in the γ4 direction by the pulling coil spring 29c. Also, as shown in FIG. 12, when a disk D is held by the supporting member 21 which has moved to the selecting position (a), the arm 28a of the holding member 28 is pressed at the perimeter of the disk D, and the perimeter of the disk D comes into contact with the positioning face 28c in a state such that the holding member 28 is slightly turned in the γ3 direction. Accordingly, the detecting portion 28h comes out from the photodetector 181, so that the detection output of the photodetector 181 is ON.

At the mechanism control unit, monitoring the detection output of the photodetector 181 switching from OFF to ON at the time of the disk D being transported in enables recognition that the disk D has been positioned and held by the supporting member 21.

When the supporting member 21 holds the disk D, the holding member 28 remains turned to the attitude shown in FIGS. 12 and 14. At the time, whether or not a disk D is held by the supporting member 21 which has reached the selecting position (a) can be detected by confirming that the detection outputs of the photodetectors 174 and 175, of the rotation detecting unit 170, shown in FIG. 20, both are ON (the supporting member 21 has moved to the selecting position (a) at this point), and confirming whether the detection output of the photodetector 181 at this time is ON or OFF.

The holding member 28 which has turned to the position shown in FIGS. 12 and 14 is pulled in the clockwise direction by the pulling coil spring 29c, pressing the disk D in the Y1 direction. However, a restricting mechanism (not shown) described below, which restricts the disk D from moving in the Y1 direction is provided within the casing. The restricting mechanism enters the center hole Da of the disk D held by the supporting member 21 when the disk D is not being held on the turntable. Accordingly, the disk D does not come loose from the supporting member 21 from the force acting on the holding member 28.

Holding Switchover Mechanism

The configuration of a holding switchover mechanism 400 shown in FIGS. 16 and 17 is described below. As shown in FIG. 16, a transmission switchover member 401 is provided on the left side face 9 of the casing 2. The transmission switchover member 401 is formed of a metal plate with multiple slots 401a extending in the Y1-Y2 direction. Multiple guide pins 402 are fixed on the inner side of the left side face 9, with each of the guide pins 402 being passed through the respective slots 401a, such that the transmission switchover member 401 can be slid in the Y1-Y2 direction.

Overlaid on the inner side of the transmission switchover member 401 is a first holding switchover member 403. The first holding switchover member 403 is formed of a metal palate, with a linking slot 403a extending in the Y1-Y2 direction. A pair of linking sliding pins 404a and 404b are fixed upon the transmission switchover member 401, with the linking sliding pins 404a and 404b being inserted into the linking slot 403a. The first holding switchover member 403 is supported by the transmission switchover member 401, and can be moved in the Y1-Y2 direction relative to the transmission switchover member 401.

A linking spring 405, which is a pulling spring, is strung between the upper edge of the transmission switchover member 401 and the upper edge of the first holding switchover member 403. The linking spring 405 pulls the first holding switchover member 403 in the Y1 direction and the transmission switchover member 401 in the Y2 direction. Consequently, in the state shown in FIG. 16, the Y2 side end of the linking slot 403 formed in the first holding switchover member 403 is pressed against the linking sliding pin 404a of the transmission switchover member 401, such that the transmission switchover member 401 and the first holding switchover member 403 are integral.

A linking piece 401b bent toward the X2 direction is integrally formed on the Z2-side edge (upper edge) of the transmission switchover member 401, and a linking slot 401c is formed on this linking piece 401b. As shown in FIGS. 8 and 9, a switchover lever 122 turned by the switchover member 91 is provided to the second motive force transmission mechanism 16. Additionally, a switchover pin 125 is provided on the X1 side end portion of the switchover lever 122. As shown in FIGS. 11 through 13, the switchover pin 125 is inserted in the linking slot 401c.

As shown in FIGS. 8, 12, and 13, upon the switchover lever 122 being turned in the counter-clockwise direction, the transmission switchover member 401 and the first holding switchover member 403 are moved together in the Y1 direction, integrally linked by the linking spring 405. As shown in FIGS. 9 and 11, upon the switchover lever 122 turning in the clockwise direction, the transmission switchover member 401 and the holding switchover member 403 are moved in the Y2 direction, while integrally linked, by the switchover pin 125.

A first switchover driving member 511 is provided on the inner side of the left side face 9 of the upper casing 5. The first switchover driving member 511 has two slots 511a extending in the Y1-Y2 direction. The slots 511a are passed over guide pins 512 fixed on the inner side of the left side face 9 such that the first switchover driving member 511 is slidably supported to slide in the Y1-Y2 direction. A pressing portion 511b is formed on the Y1 end of the first switchover driving member 511. Also, a pressable pin 513 is provided on the Z2 side of the first holding switchover member 403. The pressable pin 403 is positioned such that the pressing portion 511b of the first switchover driving member 511 presses the pressable pin 403 in the Y2 direction.

As shown in FIG. 13, in the state that the switchover lever 122 is turned in the counter-clockwise direction and the switchover pin 125 moves the transmission switchover member 401 in the Y1 direction, upon the first switchover driving member 511 moving in the Y2 direction, the pressing portion 511b provided on the first switchover driving member 511 presses the pressable pin 513 provided on the first holding switchover member 403 in the Y2 direction. At this time, the transmission switchover member 401, which is restricted by the switchover pin 125, does not move, so that the linking spring 405 stretches and the first holding switchover member 403 moves in the Y2 direction.

As shown in FIG. 16, a portion of the Y2 side of the first holding switchover member 403 is bent in the X2 direction to form a switchover pressing portion 403b. As shown in FIGS. 11 through 13 and 17, the switchover pressing portion 403b is capable of entering into the driving recess 26g of the holding member 26 provided to a supporting member 21 which has moved to the selecting position (2). As shown in FIGS. 11 and 13, upon the first holding switchover member 403 moving in the Y2 direction, the switchover pressing portion 403b presses the driving recess 26g such that the holding member 26 turns in the γ1 direction and the holding claw 26b of the holding member 26 moves to the outer side of the perimeter of the disk D.

As shown in FIG. 16, a second switchover driving member 501 is provided on the inner side of the back side face 10 of the upper casing 5. The second switchover driving member 501 has two slots 501a extending in the X1-X2 direction. Guide pins 502 fixed to the inner side of the back side face 10 are passed through the slots 501 such that the second switchover driving member 501 is supported to be capable of reciprocal movement in the X1 direction and the X2 direction.

A linking gear 504 is provided on the inner side of the X2 side end portion of the back side face 10 of the upper casing 5, which is rotatably supported by a shaft 503. An upper rack portion 501b is formed on the edge portion of the second switchover driving member 501 facing the Z1 direction such that the linking gear 504 is meshed with the upper rack portion 501b. As shown in FIG. 1, when the upper casing 5 is assembled upon the lower casing 3, the linking gear 504 meshes with the lower rack portion 54c formed on the locking member 54 provided to the lower casing 3. Accordingly, the locking member 54 and the second switchover driving member 501 are linked by the linking gear 504. Upon the locking member 54 moving in the X2 direction, the second switchover driving member 501 moves in the X1 direction, and upon the locking member 54 moving in the X1 direction, the second switchover driving member 501 moves in the X2 direction.

A second holding switchover member 505 is provided on the inner side of the back side face 10 of the upper casing 5 which moves in parallel with the second switchover driving member 501. Two slots 505a extending on the X1-X2 direction are provided on the second holding switchover member 505. Guide pins 505d provided on the back side face 10 are slidably inserted through the slots 505a. The second holding switchover member 505 is supported so as to be slidable in the X1-X2 direction.

A reversal linking lever 506 is provided between the second switchover driving member 501 and the second holding switchover member 505. The reversal linking lever 506 is turnably supported by a shaft 507 fixed to the back side face 10. A linking pin 509 is fixed to the Z1 side end of the reversal linking lever 506 that is inserted into a slot (not shown) formed on the second holding switchover member 505. A reversal control pin 508 is fixed on the Z2 end portion of the reversal linking lever 506. The reversal control pin 508 is inserted into a control slot 501c formed on the second switchover driving member 501. The control slot 501c has a crank-like shape of which the X1 side is in the proximity of the ceiling face 11, and the X2 side is away from the ceiling face 11.

As shown in FIG. 16, in a state wherein the second switchover driving member 501 is moved in the X2 direction, the reversal linking lever 506 is turned in the clockwise direction by the control slot 501c and the second holding switchover member 505 moves in the X1 direction. In the event that the second switchover driving member 501 moves in the X1 direction, the reversal linking lever 506 turns in the counter-clockwise direction and the second holding switchover member 505 moves in the X2 direction.

The second holding switchover member 505 is formed of a metal plate, with a switchover pressing portion 505b bent in the Y1 direction at the X2 end thereof, and a switchover pressing portion 505c bent in the Y1 direction at the X1 end thereof. As shown in FIG. 11, the switchover pressing portion 505b is at a position for entering the driving recess 27g of the holding member 27 provided on the supporting member 21 which has moved to the selecting position (a). In the same way, the switchover pressing portion 505c is at a position for entering the driving recess 28g of the holding member 28 provided on the supporting member 21 which has moved to the selecting position (a). As shown in FIG. 13, upon the second holding switchover member 505 moving in the X1 direction, the holding member 27 and the holding member 28 are both turned in the counter-clockwise direction by the switchover pressing portions 505b and 505c, and the holding claw 27b and the holding claw 28b are retracted away from the perimeter of the disk D.

As shown in FIG. 16, the first switchover driving member 511 provided on the inner side of the left side face 9 is provided with a linking piece 511c which has been integrally bent from the Z2 side edge in the X2 direction. A linking pin 515 is fixed to the linking piece 511c. A linking piece 501d which has been integrally bent from the Z2 side edge in the Y2 direction is provided on the second switchover driving member 501 provided on the inner side of the back side face 10. A linking pin 516 is fixed to the linking piece 501d.

As shown in FIG. 16, a linking turning plate 520 is provided on the lower face of the ceiling face 11 of the upper casing 5. The ceiling face 11 is provided with a cylindrical upper restricting member 525. The upper restricting member 525 makes up part of the restricting mechanism which enters into the center hole Da of the disk D held by the supporting member 21 to prevent the disk D from falling out from the supporting member 21. The linking turning plate 520 is capable of turning in the α direction and the β direction with the center of the restricting member 525 serving as a pivot. The linking turning plate 520 is provided with three arc-shaped slots 520a formed following an arc course a predetermined radius from the center of the restricting member 525. Guide pins 521 are fixed on the lower face of the ceiling 11, with the arc-shaped slots 520a being guided by the guiding pins 521.

A linking slot 520b and linking slot 520c are formed in the linking turning plate 520. The linking pin 515 fixed to the linking piece 511c of the first switchover driving member 511 is slidably inserted into the linking slot 520b, and the linking pin 516 fixed to the linking piece 501d of the second switchover driving member 501 is slidably inserted into the linking slot 520b.

When the linking gear 504 moves the second switchover driving member 501 in the X1 direction, the linking turning plate 520 turns in the α direction, causing the first switchover driving member 511 to move in the Y1 direction. Further, when the second switchover driving member 501 is moved in the X2 direction, the linking turning plate 520 turns in the β direction, and the first switchover driving member 511 moves in the Y2 direction.

Disk Storage Confirmation Operation

The following is a description of the overall operation of the disk storing disk device 1. In the disk storing disk device 1, which of the six supporting members 21 is holding disks is stored in RAM provided to the mechanism control unit. However, in cases of installing the disk storing disk device 1 in an automobile for the first time, or supplying power from a power source to the disk storing disk device 1 due to the battery of the automobile being replaced or the like, an operation for confirming which supporting members 21 are holding disks is performed. The following confirmation operation is performed in the event that the stored contents of the RAM and the detection state of the loading detecting unit 180 contradict each other. For example, such a case occurs when at the point that a supporting member 21, regarding which the RAM stores information that a disk is held thereby, reaches the selecting position (a), the detection output of the photodetector 181 of the loading detecting unit 180 shown in FIG. 11 and other drawings is ON, leading to a determination that no disk is held thereby. In another example, such a case occurs when at the point that a supporting member 21, regarding which the RAM stores information that a disk is not held thereby, reaches the selecting position (a), the detection output of the photodetector 181 of the loading detecting unit 180 is OFF, leading to a determination that a disk is held thereby.

With the disk loading confirmation operation, the rack member 32 is set at the position moved the farthest in the Y2 direction by the first motor M1 of the motive force transmission mechanism 12 shown in FIGS. 3 through 5. When the slider 31 and the switchover lever 38 moves in the Y2 direction, the switchover driving pin 41 provided to the switchover lever 38, as shown in FIG. 6, moves the driving slider 85 provided to the lower face of the unit supporting base 13 in the Y2 direction, and the driving unit 14 is set to the retracted position so as to not come into contact with disks D stored in the disk storing region 20.

When the second motor M2 of the second motive force transmission mechanism 16 shown in FIG. 8 starts, the switchover member 91 is moved in the (d) direction, and the transmission shaft 138 is set to a position within the non-acting portion 137a of the unit control slot 137 formed in the switchover member 91. Accordingly, the driving lever 135 is held in a state turned in the clockwise direction, and the transporting unit 17 is set to the standby position so as to not come into contact with disks D stored in the disk storing region 20.

At this time, the first switchover gear 95 is disengaged from the output gear 94, as shown in FIG. 8, by an unshown switchover means, and the second switchover gear 98 is set in a state to mesh with both the output gear 94 and the transmission gear 99. The motive force of the second motor M2 is transmitted from the output gear 94 to the transmission gear 99 shown in FIGS. 2B and 16 by way of the second switchover gear 98 such that the ring gear 160 rotates.

With the disk loading confirmation operation, the three selecting shafts 151A, 151B, and 151C provided to the supporting member selecting mechanism 22 are rotated in the counter-clockwise direction as viewed from above, and the spiral selecting grooves 152 formed on each shaft feed the supporting members 21 downwards (Z1 direction) one at a time from above. Alternatively, the selecting shafts 151A, 151B, and 151C are rotated in the clockwise direction, and the supporting members 21 are fed upwards (Z2 direction) one at a time from below. Upon the ring gear 160 rotating, the rotating member 171 of the rotation detecting unit 170 shown in FIGS. 16 and 20 rotates.

With the mechanism control unit, at the point that the two photodetectors 174 and 175 provided to the rotation detecting unit 170 both go ON, the supporting member 21 is recognized as having reached the selecting position (a). Further, counting the number of times that both the photodetectors 174 and 175 go ON enables recognition of which supporting member 21 from the top, or which supporting member 21 from the bottom, has reached the selection position (a). Upon the supporting member 21 reaching the selection position (a), as shown in FIG. 12, the detecting portion 28h of the holding member 28 provided to the supporting member 21 faces the photodetector 181 of the loading detecting unit 180. When there is no disk D held by the supporting member 21, the holding member 28 moves in the γ4 direction, the detecting portion 28h enters the photodetector 181, and resultant detection output from the photodetector 181 is OFF. When, as shown in FIG. 12, there is a disk D held by the supporting member 21 at the point of the supporting member 21 reaching the selecting position (a), the holding member 28 is pressed by the disk D and turns in the γ3 direction, the detecting portion 28h comes out from the photodetector 181, and resultant detection output from the photodetector 181 is ON.

Sequentially setting all supporting members 21 to the selecting position (a) allows confirmation regarding whether or not each supporting member 21 holds a disk D, and the inspection results thereof are stored in the RAM of the mechanisms control unit as disk storage information at the time of turning power on.

Setting for Disk Insertion Standby Mode

At the time of loading a disk D to the disk storing disk device 1, an operating unit provided on the front face 7 of the casing 2, or a remote controller, is operated, to move a supporting member 21 not holding a disk D to the selecting position (a). With the supporting member selecting operation, the driving unit 14 is set to the retracted position shown in FIG. 6, the transporting unit 17 is set at the standby position as shown in FIG. 8, and as with the above supporting member confirmation operation, the second motor M2 operates such that the supporting members 21 are fed upwards or downwards. Upon the detection output of the rotation detecting unit 170 confirming that the desired supporting member 21 has moved to the selecting position (a), the second motor M2 stops.

When a supporting member 21 not holding a disk D moves to the selecting position (a), the first motor M1 shown in FIG. 3 is started by the mechanism control. The motive force of the first motor M1 moves the rack member 32 from the position shown in FIG. 3 in the Y1 direction. The first motor M1 stops at the point that the rack member 32 has moved to the position shown in FIG. 4. When the rack member 32 moves from the position shown in FIG. 3 to the position shown in FIG. 4, the slider 31 and the switchover lever 38 also move in the Y1 direction along with the rack member 32. At this time, the switchover driving pin 41 provided to the switchover lever 38 moves the driving slider 85 from the position shown in FIG. 6 to the position shown in FIG. 7. The driving slider 85 pulls the driving shaft 88 in the Y1 direction and the driving shaft 88 moves along the arc guide 13e formed in the unit supporting base 13. The driving unit 14 then turns in the clockwise direction on the supporting shaft 84 as a pivot. Upon the driving unit 14 reaching the intervention position where between a supporting member 21 at the selecting position (a) and the supporting member 21 situated below the supporting member 21 at the selecting position (a), the first motor M1 stops.

While the rack member 32 moves from the starting end shown in FIG. 3 to the position shown in FIG. 4, the linking turning lever 44 is stopped at the position to which it has been turned in the clockwise direction, and the lock switchover member 42 is stopped at the state in which it has moved in the (b) direction. As shown in FIGS. 3 and 4, at this time, the transmission member 52 situated at the Y2 end of the first motive force transmission mechanism 12 has been turned in the clockwise direction, and the transmission member 52 moves the locking member 54 toward the X2 side. Also, as shown in FIG. 2B, the locking member 61 provided on the inner face of the front face 7 of the casing 2 is also moved toward the X2 side. The restricting shaft 77 provided behind the unit supporting base 13 is held within the restricting portion 56a of the lock control hole 56 formed in the locking member 54 shown in FIG. 1, and the restricting shafts 78 provided to the front of the unit supporting base 13 are also held by the restricting portions 62a of the lock control holes 62 formed in the locking member 61, as shown in FIG. 2B.

The unit supporting base 13 is lowered to a position in proximity of the base face 6 by compacting the dampers 71, 72, and 73. At this position, the unit supporting base 13 and the driving unit 14 are restricted in a state wherein elastic movement (moment in a state of being elastically supported by the dampers 71, 72, and 73) is disabled. Additionally, the turntable 82 of the driving unit 14 which has turned to the intervention position faces below the center hole Da of the disk D held by the supporting member 21 at the selecting position (a).

At the time of driving the selecting shafts 151A, 151B, and 151C to select the supporting member 21, and at the time of the driving unit 14 being turned to the intervention position shown in FIG. 7 from the retracted position shown in FIG. 6, the first switchover gear 95 is separated from the output gear 94 at the second motive force transmission mechanism 16 shown in FIG. 8. The switchover member 91 is stopped at the position to which it has moved in the (d) direction. At this time, the transmission shaft 138 is positioned within the non-acting portion 137a of the unit control slot 137, and the transporting unit 17 remains set at the standby position shown in FIG. 8. Due to the switchover member 91 being stopped at the position shown in FIG. 8, the shutter opening/closing member 126 is moved in the X1 direction by the driving pin 127 provided on the switchover member 91. As shown in FIG. 15A, the sliding pins 203 fixed to the shutter 201 are situated within the closing portions 202a of the opening/closing cams 202 formed on the shutter opening/closing member 126 so that the shutter 201 has descended and the insertion opening 23 is closed by the shutter 201.

When selecting the supporting member 21 while the driving unit 14 is being turned from the retracted position shown in FIG. 6 to the intervention position shown in FIG. 7, the control pin 124 of the switchover lever 122 provided to the second motive force transmission mechanism 16 is positioned within the first arc portion 121a of the switchover slot 121, as shown in FIG. 8. The switchover lever 122 has turned in the counter-clockwise direction, with the switchover pin 125 provided to the switchover lever 122 having moved to the Y1 side.

With the switchover pin 125 moved to the Y1 side, the transmission switchover member 401 linked to the switchover pin 125 is moved in the Y1 direction, and the first holding switchover member 403 linked to the transmission switchover member 401 by the linking spring 405 is also moved in the Y1 direction along with the transmission switchover member 401, as shown FIGS. 12 and 16. At this time, as shown in FIG. 12, the switchover pressing portion 403b formed on the first holding switchover member 403 faces the driving recess 26g of the holding member 26, but pressing force does not act from the switchover pressing portion 403b onto the driving recess 26g. The pulling force of the pulling coil spring 29a maintains the holding member 26 in the state of being turned in the γ2 direction.

The locking member 54 shown in FIG. 1 is moved in the X2 direction so that the lower rack portion 54c formed on the locking member 54 moves the second switchover driving member 501 shown in FIG. 16 in the X1 direction by way of the linking gear 504 provided on the upper casing 5. Further, the reversal linking lever 506 moves the second holding switchover member 505 in the X2 direction.

At this time, as shown in FIG. 12, the switchover pressing unit 505b provided to the X2 side of the second holding switchover member 505 faces the driving recess 27g of the holding member 27. However, a pressing force does not act from the switchover pressing unit 505b onto the driving recess 27g. The pulling force of the pulling coil spring 20b maintains the holding member 27 in the state of being turned in the γ4 direction.

When the second holding switchover member 505 moves in the X2 direction, the switchover pressing portion 505c provided on the X1 side of the second holding switchover member 505 also faces the driving recess 28g of the holding member 28. When no disk D is held by the supporting member 21, the pulling force of the pulling coil spring 29c turns the holding member 28 in the γ4 direction, as shown in FIG. 11. However, when a disk D is held by supporting member 21, as shown in FIG. 12, the arm 28a is pressed in the Y2 direction at the perimeter of the disk D, and the holding member 28 is turned slightly in the γ3 direction. In neither case of a disk D being held by the supporting member 21 as shown in FIG. 11 and a disk D not being held by the supporting member 21 as shown in FIG. 12 is pressing force applied from the switchover pressing portion 505c to the driving recess 28g.

With each supporting member 21 situated within the disk storing region 20, the holding member 26 maintains the state of being rotated in the γ2 direction by the pulling coil spring 29a, and the holding member 27 and the holding member 28 maintain the state of being rotated in the γ4 direction by the pulling coil springs 29b and 29c, respectively. As shown in FIG. 12, when the supporting member 21 holds a disk D, the disk D is held between the lower face of the supporting member 21, and the holding claws 26b, 27b, and 28b of the holding members 26, 27, and 28. When the supporting member 21 does not hold a disk D, the holding member 26 turns in the γ2 direction and the holding member 27, as shown in FIG. 11, is widely turned in the γ4 direction.

When the ring gear 160 provided on the supporting member selecting mechanism 22 rotates the selecting shafts 151A, 151B, and 151C and the supporting members 21 move up or down so that a supporting member 21 is selected, the second holding switchover member 505 of the first holding switchover member 403 is set, as shown in FIG. 12 as described above, so that the pressing portion 403b does not restrict the holding member 26 with regard to a supporting member 21 moving to the selecting position (a) and the switchover pressing portion 505b does not restrict the holding member 27. Further, the switchover pressing portion 505c does not restrict the holding member 28. The attitude of the holding members 26, 27, and 28 is the same between a supporting member 21 which has moved to the selecting position (a) and a supporting member 21 which has not moved to the selecting position (a).

Disk Carry-In Operation

When a supporting member 21 which does not hold a disk D moves to the selecting position (a), at the second motive force transmission mechanism 16 shown in FIG. 8, the second switchover gear 98 is disengaged from the output gear 94 and the transmission gear 99 by an unshown switchover mechanism. Motive force from the output gear 94 to the transmission gear 99 is interrupted and the ring gear 160 shown in FIG. 16 stops. Further, rotation of the selecting shafts 151A, 151B, and 151C stops, causing the supporting member 21 to stop at the selecting position (a).

The first switchover gear 95 meshes with the output gear 94, the second motor M2 starts, the motive force thereof is transmitted to the pinion gear 97, and the switchover member 91 is moved in the (e) direction further than the position shown in FIG. 8. However, the second motor M2 stops prior to the transmission shaft 138 reaching the driving inclined portion 137b of the unit control slot 137. The control pin 124 provided to the switchover lever 122 shown in FIG. 8 moves from the first arc portion 121a of the switchover slot 121 formed on the switchover member 91 to the second arc portion 121b via the switchover portion 121c.

The switchover lever 122 is turned in the clockwise direction, and the switchover pin 125 provided to the X1 side end of the switchover lever 122 is moved in the Y2 direction, as shown in FIG. 9. As shown in FIG. 11, the switchover pin 125 moves the transmission switchover member 401 in the Y2 direction, and as shown in FIG. 16, the linking spring 405 moves the first holding switchover member 403 linked to the transmission switchover member 401 in the Y2 direction. At this time, the switchover pressing portion 403b provided on the first holding switchover member 403 presses the driving recess 26b of the holding member 26 in the Y2 direction. Further, the holding member 26 is widely turned in the γ1 direction. Note that the second holding switchover member

505 provided on the inner side of the back side face 10 of the casing 2 remains moved in the X2 direction, and as shown in FIG. 11, the holding member 27 and the holding member 28 remain turned in the γ4 direction.

The switchover member 91 is driven in the (e) direction further than the position shown in FIG. 8. Upon the transmission shaft 138 stopping prior to reaching the driving inclined portion 137*b* of the unit control slot 137, the driving pin 127 provided on the switchover member 91 shown in FIG. 8 moves the shutter opening/closing member 126 in the X2 direction, so that the sliding pins 203 provided on the shutter 201 are guided to the opening portions 202*b* of the opening/closing cams 202 formed on the shutter opening/closing member 126 as shown in FIG. 15B, the shutter 201 ascends in the Z2 direction, and the insertion opening 23 is opened.

Upon a disk D being inserted from the insertion opening 23 and insertion of the disk being detected by an unshown insertion detection unit, the third motor M3 shown in FIG. 7 starts, the roller shaft 111 of the transportation unit 17 in the standby position starts, the first transporting roller 112 and the second transporting roller 113 rotate in the carry-in direction, and the disk D is nipped between the transporting rollers 112 and 113 and the nipping portion so as to be carried into the casing 2. Upon the center Do of the disk D being transported in by the transporting unit 17 in the standby position reaching around the middle portion 114 between the transporting rollers 112 and 113, the carry-in position of the disk D is detected by unshown detecting means, the second motor M2 shown in FIG. 8 is started again, and the switchover member 91 is moved in the (e) direction. The transporting shaft 138 is guided within the driving inclined portion 137*b* of the unit control slot 137 formed in the switchover member 91, and the driving lever 135 is turned in the counter-clockwise direction. The driving lever 135 causes the transporting unit 17 to turn in the counter-clockwise direction with the pivot 131 as the center of turning, so as to reach the transporting operation position shown in FIGS. 9 and 11. As shown in FIG. 9, the shutter opening/closing member 126 remains moved in the X2 direction, and as shown in FIG. 15B, the shutter 201 maintains the state of having been moved in the Z2 direction, so that the insertion opening 23 remains open.

Even while the transporting unit 17 moves from the standby position to the transporting operation position shown in FIG. 11, the transporting rollers 112 and 113 continue rotating in the transporting direction, and the disk D is transported into the casing 2 by the turning operation of the transporting unit and the rotation of the transporting rollers 112 and 113. As shown in FIG. 11, upon the transporting unit 17 reaching the transporting operation position, the transportation center line Ob of the transporting rollers 112 and 113 is directed to approximately the center of the supporting member 21.

As shown in FIG. 11, at the point that the transporting unit 17 has moved to the transporting operation position, the holding claw 26*b* of the holding member 26 which is turned in the γ1 direction enters into the transporting unit 17. The holding claw 26*b* faces below the nipping portion 106 of the transporting unit 17 shown in FIG. 10 with a gap therebetween. The disk D is guided between the holding claw 26*b* and the nipping portion 106, and is transported to the supporting member 21. The lower face of the nipping portion 106 is approximately the same height as the lower face of the supporting member 21, and is in close proximity with the supporting member 21, to prevent the perimeter of the disk D from riding up on the upper face side of the supporting member 21. The arrangement wherein the holding claw 26*b* faces below the disk being transported prevents the perimeter of the disk D from dropping down markedly in the Z1 direction. The disk D is transported to a position near the lower face of the supporting member 21.

As shown in FIG. 11, when the transporting unit 17 is in the transporting operation position, the transporting rollers 112 and 113 are inclined in the X1-X2 direction. The disk D is transported in by the transporting rollers 112 and 113 with the perimeter portion facing the X1 side passing in close proximity to the holding member 26. However, the holding member 26 is turned in the γ1 direction, the arm 26*a* is retracted to a position away from the perimeter of the disk D, and the clearance recess 26*d* is facing the perimeter of the disk D. The disk D which moves near the holding member 26 is supplied to the supporting member 21 without interference by the holding member 26.

The arm 26*a* of the holding member 26 is facing the X1 side of the disk D carried in by the transporting rollers 112 and 113, so that the arm 26*a* prevents the disk D from moving in the X1 direction. The disk D is guided to the lower face of the supporting member 21 at the selecting position (a).

Disk Position and Clamping Operations

As shown in FIG. 11, the transportation center line Ob of the transporting rollers 112 and 113 of the transporting unit 17 stopped at the transporting operation position is directed to between the selecting shaft 151B which is the center of turning of the holding member 27, and the selecting shaft 151C which is the center of turning of the holding member 28. The disk is transported toward an area between the holding member 27 and the holding member 28 of the supporting member 21 at the selecting position (a).

As shown in FIG. 11, when the disk D is not completely mounted to the supporting member 21, the holding member 28 is widely turned in the γ4 direction. The detecting portion 28*h* integrally formed with the holding member 28 enters the photodetector 181 of the loading detection unit 180 and the detection output of the photodetector 181 is OFF. When the perimeter of the disk D comes into contact with the arm 28*a* of the holding member 28, the holding member 28 is turned in the counter-clockwise direction by the disk D, and as shown in FIG. 12, the detecting portion 28*h* comes out from the photodetector 181, causing the detection output of the photodetector 181 to switch to ON. The edge of the disk D is then held between the lower face of the supporting member 21 and the holding claw 28*b* of the holding member 28, and the lower face of the supporting member 21 and the holding claw 27*b* of the holding member 27.

As shown in FIG. 14, with the disk D loaded, the holding member 27 has turned in the γ4 direction. The holding member 28 is at an attitude slightly turned in the γ3 direction as compared to the state shown in FIG. 11, so that the perimeter of the disk D abuts against the positioning face 27*c* of the cylindrical face of the holding member 27 and the positioning face 28*c* which is the cylindrical face of the holding member 28. At this time, the center D0 of the disk D is geometrically determined by the radius r of the positioning face 27*c*, the radius r of the positioning face 28*c*, and the radius Dr of the disk D. When the radius Dr of the disk D is within specifications, the center D0 of the disk D is positioned at the same position within a margin of error, and the center D0 of the disk D approximately matches the center of the turntable 82 of the driving unit 14 which is at the intervention position.

When the disk D is supplied to the lower face of the supporting member 21 and the detection output of the photodetector 181 is ON, the control operations of the mechanism control unit stops the third motor M3 and the rotation of the transporting rollers 112 and 113 stops. The transporting rollers 112 and 113 and the nipping portion 106 hold the disk D in a state abutted against the positioning face 27c and the positioning face 28c. The lower face of the nipping portion 106 provided to the transporting unit 17, which nips the disk D from above, is approximately the same height as the lower face of the supporting member 21 at the selecting position (a), so that the disk D is held in a state near the lower face of the supporting member 21.

Following the rotation of the transporting rollers 112 and 113 stopping, the first motor M1 of the first motive force transmission mechanism 12 starts and the rack member 32 moves in the Y1 direction. The slider 31 and the switchover lever 38 do not move from their positions in FIG. 4, but the rack member 32 turns the linking turning lever 44 in the counter-clockwise direction and the lock switchover member 42 moves in the (c) direction. The locking member 54 provided to the Y2 side of the lower casing 3 is moved in the X2 direction by approximately half the movement range thereof. Further, the rack member 61 shown in FIG. 2B is moved in the X1 direction by approximately half the movement range thereof.

The restricting shaft 77 provided behind the unit supporting base 13 is guided to the lifting portion 56b of the lock control hole 56 formed in the locking member 54. At approximately the same time, the restricting shafts 78 provided to the front of the unit supporting base 13 are guided to the lifting portions 62b of the lock control holes 62 formed in the locking member 61. The unit supporting base 13 is lifted away from the base face 6, the driving unit 14 supported by the unit supporting base 13 is lifted, and the center protrusion portion 82b of the turntable 82 provided to the driving unit 14 enters the center hole Da of the disk D from below.

Upon the locking member 54 moving in the X1 direction by approximately half the movement range thereof, the lower rack portion 54c formed on the locking member 54 turns the linking gear 504 shown in FIGS. 1 and 16, the second switchover driving member 501 provided on the inner side of the back side face 10 of the upper casing 5 is moved in the X2 direction, and the second holding switchover member 505 is moved in the X1 direction through the reversal linking lever 506. At this time, the switchover pressing portion 505b formed on the second holding switchover member 505 moves somewhat in the X1 direction from the position shown in FIG. 11. However, the movement of the switchover pressing member 505b at this time is only to press the driving recess 27g slightly in the X1 direction so that the holding member 27 does not widely turn in the γ3 direction and the disk D remains held between the lower face of the supporting member 21 and the holding claw 27b. In the same way, the switchover pressing portion 505c formed on the second holding switchover member 505 presses the holding member 28 slightly in the X1 direction, but the holding member 28 does not widely turn in the γ3 direction. The disk D remains held between the lower face of the supporting member 21 and the holding claw 28b.

The switchover member 91 provided to the second motive force transmission mechanism 16 is stopped at the position shown in FIG. 9, and the switchover lever 122 remains turned in the clockwise direction, so that as shown in FIG. 11, the switchover pin 125 provided to the switchover lever 122 holds the transmission switchover member 401 and the first holding switchover member 403 in the Y2 direction. At this point, the holding member 26 still remains widely turned in the γ1 direction.

Continuing from the operation of the center protrusion portion 82b of the turntable 82 entering into the center hole Da of the disk D, the motive force of the first motor M1 of the first motive force transmission mechanism 12 shown in FIG. 4 moves the rack member 32 in the Y1 direction. Upon the movement position thereof being detected by unshown detecting means, the first motor M1 stops. The linking turning lever 44 does not turn, the slider 31 and the switchover lever 38 move in the Y1 direction, and the driving slider 85 provided on the lower face of the unit supporting base 13 further moves in the Y1 direction by the switchover driving pin 41 provided to the switchover lever 38. Due to the moving force thereof, the clamp mechanism, provided to the turntable 82 operations, protrude from the perimeter of the center protrusion portion 82b of the turntable 82, the edge of the center hole Da of the disk D is held between the flange portion 82c and the clamp claws, and the center hole Da of the disk D is clamped to the turntable 82.

When the clamping of the disk is completed, the second motor M2 of the second motive force transmission mechanism 16 shown in FIG. 9 starts, the switchover member 91 is moved in the (d) direction, and as shown in FIG. 8, the transmission shaft 138 is moved from the driving inclined portion 137b of the unit control slot 137 provided in the switchover member 91 to the non-acting portion 137a. The driving lever 135 is turned in the clockwise direction, and the transporting unit 17 turns from the transporting operation position shown in FIG. 9 in the clockwise direction to the standby potion shown in FIG. 8. At this time, the third motor M3 rotates the transporting rollers 112 and 113 in the direction of carrying the disk D in. While the transporting rollers 112 and 113 roll over the surface of the disk D, the transporting unit 17 turns from the transporting operation position to the standby position. At this time, arranging for the circumferential velocity of the rotation of the transporting rollers 112 and 113 to be slightly faster than the turning speed of the transporting unit 17 allows the transporting unit 17 to be returned to the standby position shown in FIG. 8 while the disk D is pressed against the positioning face 27c of the holding member 27 and the positioning face 28c of the holding member 28 as shown in FIG. 14.

As shown in FIG. 8, when the switchover member 91 moves in the (d) direction and the transporting unit 17 returns to the standby position, the driving pin 127 provided to the switchover member 91 moves the shutter opening/closing member 126 provided on the inner face of the front face 7 of the casing 2 in the X1 direction. As shown in FIG. 15A, the sliding pins 203 provided on the shutter 201 are guided to the closing portions 202a of the opening/closing cams 202 such that the shutter 201 is lowered in the Z1 direction and the insertion opening 23 formed on the front face 7 of the casing 2 is closed with the shutter 201.

As shown in FIG. 8, the control pin 124 is guided within the first arc potion 121a of the switchover slot 121, and the switchover lever 122 is turned in the counter-clockwise direction. As shown in FIG. 12, the switchover pin 125 provided on the X1 end of the switchover lever 122 moves the transmission switchover member 401 provided on the inner face of the left side face 9 of the casing 2 in the Y1 direction and the linking spring 405 moves the first holding switchover member 403 integrally linked with the transmission switchover member 401 in the Y1 direction. As shown in FIG. 12, the switchover pressing portion 403b provided on the first holding switchover member 403 moves in the Y1 direction, the switchover pressing portion 403b releases the restriction of the holding member 26 and the holding member 26 turns in the γ2 direction.

At this point, the disk D is held between the lower face of the supporting member 21, and the holding claws 26b, 27b, and 28b of the holding members 26, 27, and 28.

Setting the Disk Driving Mode

When the disk D is clamped to the turntable 82, the transporting unit 17 moves to the standby position and the insertion opening 23 being closes the shutter 201. The first motor M1 provided to the first motive force transmission mechanism 12 starts again and the rack member 32 is moved in the Y1 direction to the end shown in FIG. 5.

As shown in FIG. 5, the motive force of the rack member 32 at this time does not act upon the slider 31 or the switchover lever 38, but the linking turning lever 44 turns in the counterclockwise direction and the lock switchover member 42 is turned to the end in the (c) direction. The locking member 54 is moved to the end in the X1 direction and the locking member 61 is moved to the end in the X1 direction. The restricting shaft 77 provided behind the unit supporting base 13 is guided to the escape hole 56d of the lock control hole 56 formed in the locking member 54 and the restricting shafts 78 provided to the front of the unit supporting base 13 are guided to the escape holes 62d of the lock control holes 62 formed in the locking member 61 so that the locking members 54 and 61 release the restriction on the restricting shafts 77 and 78.

When the slider 31 moves to the position shown in FIG. 5, the switchover lever 38 is widely turned in the clockwise direction by the cam portion formed on the base face 6 and the attitude control pin provided to the switchover lever 38. As shown in FIG. 7, the driving pin 41 provided to the switchover lever 38 moves to inside an escape portion 86b of a driving hole 86 formed on the driving slider 85. The unit supporting base 13 and the driving unit 14 are not subjected to restriction force, and are supported elastically by the dampers 71, 72, and 73.

At this time, the linking gear 504 shown in FIG. 16 is turned by the lower rack portion 54c of the locking member 54 moving to the end in the X1 direction, the second switchover driving member 501 provided on the inner side of the back side face 10 is further moved in the X2 direction, and the second holding switchover member 505 is moved in the X1 direction by way of the reversals linking lever 506. Additionally, the linking turning plate 520 provided on the ceiling face 11 is turned in the β direction by the second switchover driving member 501 moving in the X2 direction, and the first switchover driving member 511 linked to the linking turning plate 520 is moved in the Y2 direction.

At the time of the first switchover driving member 511 moving in the Y2 direction, the pressing portion 511b provided on the Y1 end of the first switchover driving member 511 pulls the pressable pin 513 fixed to the first holding switchover member 403 in the Y2 direction. At this time, as shown in FIG. 13, the transmission switchover member 401 provided to the inner side of the left side face 9 is restricted in a state of being moved in the Y1 direction by the switchover pin 125 provided to the switchover lever 122 so that at the time of the first switchover driving member 511 moving in the Y2 direction, the transmission switchover member 401 does not move. However, the linking spring 405 stretches and the first holding switchover member 403 is moved in the Y2 direction.

As shown in FIG. 13, the switchover pressing portion 403b provided on the first holding switchover member 403 presses the driving recess 26g of the holding member 26 in the Y2 direction so that the holding member 26 is turned in the γ1 direction and the holding claw 26b is separated outwards from the perimeter of the disk D clamped to the turntable 82. The switchover pressing portion 505b provided on the second holding switchover member 505 presses the driving recess 27g of the holding member 27 in the X1 direction so that the holding member 27 is turned in the γ3 direction and the holding claw 27b moves outwards from the perimeter of the disk D. The driving recess 28g of the holding member 28 is pressed in the X1 direction by the switchover pressing portion 505c, so that the holding member 28 is turned in the γ3 direction and the holding claw 28b moves outwards from the perimeter of the disk D.

The restricting shaft 77 provided behind the unit supporting base 13 is guided from the lifting portion 56b of the lock control hole 56 formed in the locking member 54 to the escape hole 56d. The restricting shafts 78 provided to the front of the unit supporting base 13 are guided from the lifting portions 62b of the lock control holes 62 formed in the locking member 61 to the escape hole 62d, whereupon the unit supporting base 13 is in a state elastically supported by the dampers 71, 72, and 73, and the driving unit 14 having the turntable 82 moves closer to the base face side 6 as compared to when clamping. As described above, the holding claws 26b, 27b, and 28b are separated outwards from the perimeter of the disk D so that the disk D separates downwards in the Z1 direction from the lower face of the supporting member 21 at the selecting position (a).

When the spindle motor drives the turntable 82, the disk D rotates, the signals recorded in the disk D are read by the optical head 83, or signals are recorded to the disk D.

In the event of vibrations from the vehicle body acting upon the casing 2, the unit supporting base 13 elastically supported by the dampers 71, 72, and 73 moves vertically and horizontally, thereby reducing read error of the signals reproduced by the optical head 83 due to the vibration absorbing functions of the dampers 71, 72, and 73.

As shown in FIG. 13, when the turntable 82 rotationally drives the disk D, the clearance recess 26d of the holding member 26 is directed toward the perimeter of the disk D and the clearance recesses 27d and 28d of the holding members 27 and 28 are directed toward the perimeter of the disk D. As described earlier, the driving unit 14 has descended in the Z1 direction, so that the disk D which is clamped to the turntable 82 and is being rotationally driven is away from the holding members 26, 27, and 28 of the supporting member 21 in the Z1 direction. However, it should be noted that there are cases wherein the driving unit 14 rotationally driving the disk rises in the Z2 direction within the elastic supporting range of the dampers 71, 72, and 73, and may sway in the disk face direction of the disk D. Even so, the clearance portions 26d, 27d, and 28d face the perimeter of the disk D so that even in the event that the driving unit 14 rises and sways in the disk face direction of the disk D, the probability of the disk D colliding with one of the holding members 26, 27, or 28 is reduced.

Disk Storage Operation

When the driving unit 14 has completed driving a disk to the disk storage region 20 for storage, the first motor M1 of the first motive force transmission mechanism 12 is started, the rack member 32 is returned from the position shown in FIG. 5 to the Y2 direction, the lock switchover member 42 is moved in the (b) direction, and the locking member 54 and the locking member 61 are moved in the X2 direction. During this process, the restricting shaft 77 moves to the lifting portion 56b of the lock control hole 56 shown in FIG. 1 and the restricting shafts 78 move to the lifting portions 62b of the lock control holes 62 shown in FIG. 2B so that the unit supporting base 13 and the driving unit 14 are lifted.

The disk D clamped to the turntable 82 is pressed against the lower face of the supporting member 21 at the selecting position (a). The moving force in the X2 direction of the locking member 54 at this time is transmitted from the lower rack portion 54c to the second switchover driving member 501 via the linking gear 504 shown in FIG. 16, so that the second switchover driving member 501 is moved in the X1 direction and the second holding switchover member 505 is moved in the X2 direction by way of the reversal linking lever 506. The first switchover driving member 511 is moved in the Y1 direction by the second switchover driving member 501 via the linking turning plate 520, the pressing force of the pressing portion 511b of the first switchover driving member 511 on the pressable pin 513 is released, and the first holding switchover member 403 is returned in the Y1 direction by the pressing force of the linking spring 405.

As shown in FIG. 12, by the switchover pressing portion 403b of the first holding switchover member 403 moving in the Y1 direction, the pulling coil spring 29a turns the holding member 26 in the γ2 direction. Additionally, due to the switchover pressing portion 505b and the switchover pressing portion 505c of the second holding switchover member 505 moving in the X2 direction, the pulling coil spring 29b turns the holding member 27 in the γ4 direction and the pulling coil spring 29c turns the holding member 28 in the γ4 direction. The disk D which is pressed against the lower face of the supporting member 21 is held by the lower face of the supporting member 21 and the holding claws 26b, 27b, and 28b.

When the first motor M1 of the first motive force transmission mechanism 12 moves the rack member 32 in the Y2 direction and the slider 31 and switchover lever 38 move in the Y2 direction, the driving slider 85 provided on the lower face of the unit supporting base 13 is moved in the Y2 direction, the clamping mechanism provided to the turntable 82 operates, and the clamping claws are retracted to within the center protrusion portion 82b of the turntable 82, thereby releasing the clamping of the disk with the turntable 82.

When the first motor M1 of the first motive force transmission mechanism 12 moves the rack member 32 in the Y2 direction, the linking turning lever 44 turns in the clockwise direction, the lock switchover member 42 moves in the (b) direction, the locking member 54 returns to the initial position at the X2 side, and the locking member 61 returns to the initial position at the X2 side. The restricting shaft 77 provided behind the unit supporting base 13 is held at the restricting portion 56a of the lock control hole 56, and the restricting shafts 78 provided to the front of the unit supporting base 13 are held at the restricting portions 62a of the lock control hole 62 formed in the locking member 61.

The unit supporting base 13 and the driving unit 14 are lowered to a position near the base face 6, and the center protrusion portion 82b of the turntable 82 is removed in the Z1 direction from the center hole Da of the disk D held by the supporting member 21.

In this case as well, the linking gear 504 moves the second switchover driving member 501 shown in FIG. 16 in the X1 direction due to the motive force of the locking member 54 in the X2 direction, and the reversal linking lever 506 returns the second holding switchover member 505 in the X2 direction. The first switchover driving member 511 is moved in the Y1 direction through the linking turning plate 520 and the first holding switchover member 403 is returned in the Y1 direction.

As shown in FIG. 12, the holding member 26 is not restricted by the switchover pressing portion 403b of the first holding switchover member 403, and the holding members 27 and 28 are not restricted by the switchover pressing portions 505b and 505c of the second holding switchover member 505.

Disk Discharging Operation

When the driving unit 14 has completed discharging a disk D from the insertion opening 23 in the disk driving mode shown in FIG. 13, the spindle motor stops, and the rotation of the turntable 82 stops. The rack member 32 of the first motive force transmission mechanism 12 is moved in the Y2 direction, and the locking members 54 and 61 are moved in the X2 direction. The unit supporting base 13 is lifted, and the disk D is pressed against the lower face of the supporting member 21 at the selecting position (a). The second switchover driving member 501 shown in FIG. 16 is moved in the X1 direction, and the first switchover driving member 511 is moved in the Y1 direction, due to the moving force in the X2 direction of the lower rack portion 54c formed on the locking member 54, so that as shown in FIG. 12, the holding member 26 is turned in the γ2 direction, the holding members 27 and 28 are turned in the γ4 direction, and the disk D is held between the lower face of the supporting member 21 and the holding claws 26b, 27b, and 28b.

Subsequently, as shown in FIG. 9, the switchover member 91 is moved in the (e) direction, and the transporting unit 17 is moved from the standby position to the transporting operation position. At this time, the transporting rollers 112 and 113 are rotated in the carry-out direction by the third motor M3. When the transporting unit 17 is turning to the transporting operation position, the Y1 edge of the disk D supported by the supporting member 21 is smoothly nipped between the transporting rollers 112 and 113 and the nipping portion 106.

Upon the transporting unit 17 moving to the transporting operation position, and the rotation of the transporting rollers 112 and 113 stopping, the rack member 32 of the first motive force transmission mechanism 12 is further moved in the Y2 direction, the clamping of the disk D at the turntable 82 is disengaged, the locking member 54 and the locking member 61 are moved in the X2 direction by the moving force of the rack member 32 in the Y2 direction, the unit supporting base 13 and the driving unit 14 are lowered toward the base face, and the center protrusion portion 82b of the turntable 82 is removed in the Z1 direction from the center hole Da of the disk D.

At this time, the disk D is held between the lower face of the supporting member 21 and the holding claws 27b and 28b as shown in FIG. 11, but as shown in FIG. 9, the switchover member 91 moves in the (e) direction and the transporting unit 17 is at the transporting operation position. Further, the switchover lever 122 turns in the clockwise direction and the switchover pin 125 moves in the Y2 direction so that the holding member 26 turns in the γ1 direction and the holding claw 26b enters the transporting unit 17 so as to face the nipping portion 106 within the transporting unit 17.

The shutter opening/closing member 126 moves in the X2 direction due to the moving force of the switchover member 91 in the (e) direction at the time of the transporting unit 17 moving to the transporting operation position. As shown in FIG. 15B, the shutter 201 rises and the insertion opening 23 is released.

Following the center protrusion portion 82b of the turntable 82 being removed from the center hole Da of the disk D, the transporting rollers 112 and 113 are turned in the carry-out direction, the transporting unit 17 is turned from the transporting operation position shown in FIG. 11 to the standby position shown in FIG. 8, and the disk D is discharged from the insertion opening 23.

When discharging a disk D within the disk sorting region 20, the driving unit 14 is moved to the retracted position, and the transporting unit 17 is moved to the standby position, the selecting shafts 151A, 151B, and 151C are rotated such that the supporting member 21 holding the disk to be discharged is moved to the selecting position (a).

The driving unit 14 is turned to the intervention position shown in FIG. 11 and other drawings, and the unit supporting base 13 and driving unit 14 are raised in the Z2 direction by the locking members 54 and 61, thereby clamping the disk D with the turntable 82. The transporting unit 17 is moved to the transporting operation position, and the disk D is nipped between the transporting rollers 112 and 113, and the nipping portion 106. The clamping of the disk D with the turntable 82 is disengaged, the center protrusion portion 82b of the turntable 82 is removed downwards from the center hole Da of the disk D, and the transporting unit 17 is turned to the standby position while rotating the transporting rollers 112 and 113 in the carry-out direction, thereby discharging the disk D from the insertion opening 23.

In one embodiment, an arrangement is made wherein the first motive force transmission mechanism 12 including the first motor M1, the reducing gears 34, 35, 36, the pinion gear 37, the rack member 32, the slider 31, and the switchover lever 38. The first motive force transmission mechanism 12 moves the driving unit 14 from the retracted position to the intervention position. Following moving the driving unit 14 from the retracted position to the intervention position, the disk D held by the supporting member 21 is clamped by the turntable 82, with the motive force of the first driving motor M1 being used to move the holding members 26, 27, and 28 from the holding position to the holding disengaged position. Further, the locking members 54 and 61 are moved from the restricting position for restricting elastic movement of the driving unit 14 to a restriction disengaged position wherein the restriction is disengaged.

However, it should be noted that the first motive force transmission mechanism 12 is by no way restricted to the configuration described in the above invention, and that known motive force transmission mechanisms may be used to make various modifications. In the same way, the detailed configuration of the holding switchover mechanism 400 described above may be subjected to various modifications within the scope of known motive force transmission mechanisms.

It is therefore intended that the foregoing detailed description be regarded as illustrative rather than limiting, and that it be understood that it is the following claims, including all equivalents, that are intended to define the spirit and scope of this invention.

The invention claimed is:

1. A disk-storing disk device comprising a casing, the casing comprising:
    a driving unit comprising a rotational driving unit for rotating a disk;
    a plurality of supporting members operative to support a disk, the plurality of supporting members disposed in a stacked manner in an axial direction of the disk;
    a supporting member selecting mechanism operative to spread a spacing between a selected supporting member of the plurality of supporting members and another supporting member of the plurality of supporting members that is adjacent to the selected supporting member;
    a motive force transmission mechanism operative to move the driving unit from a retracted position away from a perimeter of a disk supported by one of the plurality of supporting members to an intervention position to clamp the disk supported by the one of the plurality of supporting members with the rotational driving unit;
    a transporting mechanism operative to transport a disk inserted from an insertion opening of the casing to the selected supporting member;
    a plurality of holding members movably supported by each of said supporting members, the plurality of holding members operative to hold a disk between the plurality of holding members and each of the supporting members when said supporting member selecting mechanism moves the plurality of supporting members in said axial direction of the disk;
    a holding switchover mechanism operative to move each of the plurality of holding members from a holding position for holding a disk to a holding disengaged position for disengaging the holding of the disk;
    wherein following a motive force of the motive force transmission mechanism moving the driving unit from the retracted position to the intervention position, the holding switchover mechanism is operated by a driving force of a driving source of
    the motive force transmission mechanism, whereby the plurality of holding members are moved from the holding position to the holding disengaged position;
    first and second side walls of the casing; and
    first and second holding switchover members for moving along the first and second side walls, the first and second holding switchover members being provided to the holding switchover mechanism;
    wherein a first holding member of the plurality of holding members is positioned to face the first side wall of the casing, and a second holding member of the plurality of holding members is positioned to face the second wall of the said casing; and
    wherein the first and second holding members are moved to the holding disengaged position by the first holding switchover member provided on the inner side of the first side wall and the second holding switchover member provided on the inner side of the second side wall.

2. The disk-storing disk device of claim 1, wherein following the driving unit having moved from the retracted position to the intervention position, a disk held by the selected supporting member is clamped by the rotational driving unit, and the plurality of holding members are moved from the holding position to the holding disengaged position by subsequent motive force of the driving source.

3. The disk-storing disk device of claim 1, further comprising:
    a side wall of the casing; and
    a holding switchover member for moving along the side wall, the holding switchover member being provided to the holding switchover mechanism;
    wherein the holding members are at a position facing the side wall of the casing, and are moved to the holding disengaged position by the moving force of the holding switchover member.

4. The disk-storing disk device of claim 1, further comprising:
    a second switchover driving member reciprocally driven by the motive force of said driving source, the second switchover driving member disposed on the inner side of the second side wall; and
    a reversal transmission lever operative to reverse the moving force of the second switchover driving member to transmit the moving force to the second holding switchover member;
    wherein the first holding member is positioned to face the first side wall of the casing, and the second holding member is positioned to face the second side wall of the casing, and the first and second holding member are operative to move to the holding disengaged position by turning in mutually opposite directions.

5. The disk-storing disk device of claim 1, further comprising:
a first switchover driving member, disposed on an inner side of the first side wall, operative to drive the first holding switchover member;
a ceiling face of the casing; and
a linking turning plate provided on the ceiling face;
wherein the moving force of the second switchover driving member is transmitted to the first switchover driving member by the linking turning plate.

6. A disk-storing disk device comprising a casing, the casing comprising:
a driving unit comprising:
a rotational driving unit operative to drive a disk, and
elastic supporting members elastically supporting the driving unit;
a plurality of supporting members operative to support a disk, the plurality of supporting members disposed in a stacked manner in a axial direction of the disk;
a supporting member selecting mechanism operative to spread a spacing between a selected supporting member of the plurality of supporting members and another supporting member of the plurality of supporting member that is adjacent to the selected supporting member;
a locking member operative to restrict elastic movement of the driving unit until a disk supported by the selected supporting member is clamped by the rotational driving unit;
a motive force transmission mechanism operative to move the locking member from a restricting position where elastic movement of the driving unit is restricted to a restriction disengaged position where the restriction is disengaged;
a transporting mechanism operative to transport a disk inserted at an insertion opening of the casing to the selected supporting member;
a plurality of holding members movably supported by each supporting member of the plurality of supporting members, the plurality of holding members operative to hold a disk between the plurality of holding members and each of the supporting members when said supporting member selecting mechanism moves the plurality of supporting members in said axial direction of the disk; and
a holding switchover mechanism operative to move each of the plurality of holding members from a holding position for holding a disk to a holding disengaged position for disengaging holding of the disk;
wherein each of the plurality of holding members is moved to the holding disengaged position from the holding position by the motive force of the motive force transmission mechanism, and the holding switchover mechanism is operated by the driving force of a driving source, whereby the locking member is moved from the restricting position to the restriction disengaged position.

7. The disk-storing disk device of claim 6, wherein at the time of the locking member being moved from the restricting position to the restriction disengaged position, the motive force of the driving source is directly transmitted from the locking member to the holding switchover mechanism, and the locking member is moved to the restriction disengaged position.

8. The disk-storing disk device of claim 7, further comprising:
a rack portion formed on the locking member; and
a linking gear disposed within the casing that is operative to mesh with the rack portion;
wherein the holding switchover mechanism is operated by the linking gear.

9. The disk-storing disk device of claim 6, further comprising:
a side wall of the casing; and
a holding switchover member for moving along the side wall, the holding switchover member being provided to the holding switchover mechanism;
wherein the plurality of holding members are at a position facing the side wall of the casing, and are moved to the holding disengaged position by the moving force of the holding switchover member.

10. The disk-storing disk device of claim 6, further comprising:
first and second side walls of the casing; and
first and second holding switchover members for moving along the first and second side walls, the first and second holding switchover members being provided to the holding switchover mechanism;
wherein a first holding member of the plurality of holding members is positioned to face the first side wall of the casing, and a second holding member of the plurality of holding members is positioned to face the second wall of said casing; and
wherein the first and second holding members are moved to the holding disengaged position by the first holding switchover member provided on the inner side of the first side wall, and the second holding switchover member provided on the inner side of the second side wall.

11. The disk-storing disk device of claim 10, further comprising:
a second switchover driving member reciprocally driven by the motive force of the driving source, the second switchover driving member disposed on the inner side of the second side wall; and
a reversal transmission lever for reversing the moving force of the second switchover driving member to transmit the moving force to the second holding switchover member;
wherein the first holding member is positioned to face the first side wall of the casing, and the second holding member is positioned to face the second wall of the casing, the first and second holding member operative to move to the holding disengaged position by turning in mutually opposite directions.

12. The disk-storing disk device of claim 11, further comprising:
a first switchover driving member, disposed on the inner side of the first side wall, operative to drive the first holding switchover member;
a ceiling face of the casing; and
a linking turning plate provided on the ceiling face;
wherein the moving force of the second switchover driving member is transmitted to the first switchover driving member by the linking turning plate.

13. A disk-storing disk device comprising a casing, the casing comprising:
a driving unit comprising:
a rotational driving unit operative to rotate a disk, and
elastic supporting members operative to elastically support the driving unit;

a plurality of supporting members which are operative to support a disk, the plurality of supporting members disposed in a stacked manner in a axial direction of the disk;

a supporting member selecting mechanism operative to spread a spacing between a selected supporting member of the plurality of supporting members and another supporting member of the plurality of supporting members that is adjacent to the selected supporting member;

a motive force transmission mechanism operative to move the driving unit from a retracted position away from a perimeter of a disk supported by one of the plurality of supporting members to an intervention position for clamping the disk supported by the plurality of supporting member with the rotational driving unit;

a locking member operative to restrict elastic movement of the driving unit until a disk supported by the selected supporting member is clamped by the rotational driving unit;

a transporting mechanism operative to transport a disk inserted from an insertion opening of the casing to the selected supporting member;

a plurality of holding members movably supported by each supporting member of the plurality of supporting members, the plurality of holding members operative to hold a disk between the plurality of holding members and each of the supporting members when said supporting member selecting mechanism moves the plurality of supporting members in said axial direction of the disk; and a holding switchover mechanism operative to move each of the plurality of holding members from a holding position for holding a disk to a holding disengaged position for disengaging the holding of the disk;

wherein following the driving unit being moved to the intervention position from the retracted position by the motive force of the transmission mechanism, the holding switchover mechanism is operated by the driving force of a driving source of the motive force transmission mechanism, whereby the plurality of holding members are moved from the holding position to the holding disengaged position and the locking member is moved from a restricting position where elastic movement of the driving unit is restricted to a restriction disengaged position where the restriction is disengaged.

14. The disk-storing disk device of claim 13, wherein following the driving unit moving from the retracted position to the intervention position, a disk held by the selected supporting member is clamped by the rotational driving unit by the motive force of the driving source, and the holding members are moved from the holding position to the holding disengaged position by subsequent motive force of the driving source.

15. The disk-storing disk device of claim 13, wherein at the time of the locking member being moved from the restricting position to the restriction disengaged position, the motive force of the driving source is directly transmitted from the locking member to the holding switchover mechanism, and the locking member is moved to the restriction disengaged position.

16. The disk-storing disk device of claim 15, further comprising:

a rack portion formed on the locking member; and a linking gear disposed within the casing operative to mesh with the rack portion;

wherein the holding switchover mechanism is operated by the linking gear.

17. The disk-storing disk device of claim 13, further comprising:

a side wall of the casing; and a holding switchover member for moving along the side wall, the holding switchover member being provided to the holding switchover mechanism;

wherein the plurality of holding members are at a position facing the side wall of the casing, and are moved to the holding disengaged position by the moving force of the holding switchover member.

18. The disk-storing disk device of claim 13, further comprising:

first and second side walls of said casing; and first and second holding switchover members for moving along the first and second side walls, the first and second holding switchover members being provided to the holding switchover mechanism;

wherein a first holding member of the plurality of holding members is positioned to face the first side wall of the casing, and a second holding member of the plurality of holding members is positioned to face the second wall of the casing; and wherein the first and second holding members are moved to the holding disengaged position by the first holding switchover member provided on the inner side of the first side wall, and the second holding switchover member provided on the inner side of the second side wall.

19. The disk-storing disk device of claim 18, further comprising:

a second switchover driving member reciprocally driven by the motive force of the driving source, disposed on the inner side of the second side wall; and a reversal transmission lever operative to reverse the moving force of the second switchover driving member to transmit the moving force to the second holding switchover member;

wherein the first holding member is positioned to face the first side wall of the casing, and the second holding member is positioned to face the second wall of the casing, the first and second holding members operative to move to the holding disengaged position by turning in mutually opposite directions.

20. The disk-storing disk device of claim 19, further comprising:

a first switchover driving member, disposed on the inner side of the first side wall, operative to drive the first driving switchover member;

a ceiling face of the casing; and a linking turning plate provided on the ceiling face;

wherein the moving force of the second switchover driving member is transmitted to the first switchover driving member by the linking turning plate.

* * * * *